United States Patent
Kurita et al.

(10) Patent No.: US 10,460,422 B2
(45) Date of Patent: Oct. 29, 2019

(54) IMAGE PROCESSING DEVICE AND IMAGE PROCESSING METHOD

(71) Applicant: SONY CORPORATION, Tokyo (JP)

(72) Inventors: Teppei Kurita, Tokyo (JP); Shun Kaizu, Kanagawa (JP); Yuhi Kondo, Tokyo (JP); Yasutaka Hirasawa, Tokyo (JP); Ying Lu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/765,086

(22) PCT Filed: Sep. 9, 2016

(86) PCT No.: PCT/JP2016/076607
§ 371 (c)(1),
(2) Date: Mar. 30, 2018

(87) PCT Pub. No.: WO2017/081925
PCT Pub. Date: May 18, 2017

(65) Prior Publication Data
US 2018/0308217 A1 Oct. 25, 2018

(30) Foreign Application Priority Data

Nov. 10, 2015 (JP) .................................. 2015-220412
Apr. 13, 2016 (JP) .................................. 2016-080220

(51) Int. Cl.
*G06T 3/40* (2006.01)
*H04N 9/04* (2006.01)
(Continued)

(52) U.S. Cl.
CPC ............ *G06T 3/4015* (2013.01); *B60R 11/02* (2013.01); *G01J 4/02* (2013.01); *G06T 3/40* (2013.01);
(Continued)

(58) Field of Classification Search
CPC ............ H04N 5/232; H04N 5/30; H04N 9/07; H04N 9/083; H04N 9/04515;
(Continued)

(56) References Cited

U.S. PATENT DOCUMENTS 5,557,324 A * 9/1996 Wolff ........................ G01J 4/00
345/207
8,078,048 B2 * 12/2011 Kuroki ................. H04N 13/337
396/322

(Continued)

FOREIGN PATENT DOCUMENTS

| JP | 4235252 B2 | 3/2009 |
| JP | 4500360 B2 | 7/2010 |
| WO | WO 2013/158975 A1 | 10/2013 |

OTHER PUBLICATIONS

May 22, 2019, European Search Report issued for related EP Application No. 16863889.8.
(Continued)

*Primary Examiner* — Lin Ye
*Assistant Examiner* — Chriss S Yoder, III
(74) *Attorney, Agent, or Firm* — Paratus Law Group, PLLC

(57) ABSTRACT

The polarization imaging unit generates a polarized image including pixels for each of a plurality of polarization components. The demosaicing unit calculates a pixel signal for each polarization component by using the pixel signal of the target pixel of the polarized image and the pixel signal of the pixel for each of the identical polarization components located near the target pixel. In one example, a low frequency component is calculated for each polarization component using the pixel signal of the pixel located near the target pixel for each of the identical polarization components. In addition, component information indicating relationship between the low frequency component of the polar-
(Continued)

ization component of the polarized image and the pixel signal of the target pixel is acquired. Furthermore, the pixel signal for each polarization component in the target pixel is calculated based on the low frequency component and the component information for each polarization component.

22 Claims, 28 Drawing Sheets

(51) Int. Cl.
    *B60R 11/02*     (2006.01)
    *H04N 5/232*     (2006.01)
    *G06T 7/90*     (2017.01)
    *H04N 5/30*     (2006.01)
    *H04N 9/083*     (2006.01)
    *H04N 9/31*     (2006.01)
    *G01J 4/02*     (2006.01)
    *G01J 4/00*     (2006.01)

(52) U.S. Cl.
    CPC .............. *G06T 7/90* (2017.01); *H04N 5/232* (2013.01); *H04N 5/30* (2013.01); *H04N 9/045* (2013.01); *H04N 9/04515* (2018.08); *H04N 9/04551* (2018.08); *H04N 9/083* (2013.01); *H04N 9/3182* (2013.01); *G01J 2004/005* (2013.01)

(58) Field of Classification Search
    CPC ............ H04N 9/3182; H01L 31/02162; H01L 31/02165; G06T 3/40; G06T 3/4015; G06T 7/90; G02B 6/0056; G01J 5/0825; B60R 11/02
    See application file for complete search history.

(56) References Cited

U.S. PATENT DOCUMENTS

2009/0290039 A1* 11/2009 Kanamori .............. H04N 9/045
    348/222.1
2010/0282945 A1* 11/2010 Yokogawa ........ H01L 27/14621
    250/208.1
2015/0215593 A1     7/2015 Sambongi

OTHER PUBLICATIONS

Glotzbach et al., A Method of Color Filter Array Interpolation With Alias Cancellation Properties, Proceedings 2001 International Conference on Image Processing, Oct. 7-10, 2001, pp. 141-144, IEEE, Thessaloniki, Greece.

Ratliff et al., Mitigation of Image Artifacts in LWIR Microgrid Polarimeter Images, Polarization Science and Remote Sensing III, Sep. 2007, pp. 1-13, vol. 6682, SPIE.

Ratliff et al., Adaptive Strategy for Demosaicing Microgrid Polarimeter Imagery, 2011 Aerospace Conference, Mar. 5-12, 2011, pp. 1-9, IEEE, Big Sky, MT, USA.

Rahmann et al., Reconstruction of Specular Surfaces using Polarization Imaging, Proceeding of the 2001 IEEE Computer Society Conference on Computer Vision and Pattern Recognition. CVPR 2001, Dec. 8-14, 2001, pp. 149-155, IEEE, Kauai, HI, USA.

* cited by examiner

FIG. 5

|  |  |  |  |  |
|---|---|---|---|---|
| 1 | 4 | 6 | 4 | 1 |
| 4 | 16 | 24 | 16 | 4 |
| 6 | 24 | 36 | 24 | 6 |
| 4 | 16 | 24 | 16 | 4 |
| 1 | 4 | 6 | 4 | 1 |

(b)

|  |  |  |  |  |
|---|---|---|---|---|
| C3 | C4 | C3 | C4 | C3 |
| C2 | C1 | C2 | C1 | C2 |
| C3 | C4 | C3 | C4 | C3 |
| C2 | C1 | C2 | C1 | C2 |
| C3 | C4 | C3 | C4 | C3 |

IMAGE PROCESSING DEVICE AND IMAGE PROCESSING METHOD

CROSS REFERENCE TO PRIOR APPLICATION

This application is a National Stage Patent Application of PCT International Patent Application No. PCT/JP2016/076607 (filed on Sep. 9, 2016) under 35 U.S.C. § 371, which claims priority to Japanese Patent Application Nos. 2015-220412 (filed on Nov. 10, 2015) and 2016-080220 (filed on Apr. 13, 2016), which are all hereby incorporated by reference in their entirety.

TECHNICAL FIELD

This technology makes it possible to acquire high resolution information from a polarized image including pixels for each of a plurality of polarization components.

BACKGROUND ART

In related art, polarization information is necessary to be acquired to obtain a three-dimensional shape or the like of a photographic object. In one example, Patent Literature 1 discloses an image capturing device provided with an image capture element having a color mosaic filter and a polarizer having polarization transmission planes that define different angles within each single color pixel of the color mosaic filter so that a signal indicating color information and polarization information is generated. In addition, processing for acquiring color intensity information by averaging intensities of light rays transmitted through a number of polarizer units within each single color pixel is performed by using the signal indicating color information and polarization information. In addition, processing for approximating, as a sinusoidal function, a relation between the intensities of light rays transmitted through the polarizer units within each single color pixel and the angles of the polarization transmission planes of the polarizer units to acquire the polarization information is performed. In Patent Literature 2, four types of polarizers are provided for green (G) pixels of an image capture element having a Bayer type color mosaic filter, thereby generating color information and polarization information. In addition, the polarization information at a location of red (R) pixel or blue (B) pixel is acquired using the green color pixel provided with four types of polarizers. Furthermore, the color mosaic interpolation processing for generating a color intensity image, from the generated signal, by using a triangular area including three polarizer units, which have polarization transmission planes defining mutually different angles and are adjacent to each other, as a pixel unit, is performed.

CITATION LIST

Patent Literature

Patent Literature 1: JP 4235252B
Patent Literature 2: JP 4500360B

DISCLOSURE OF INVENTION

Technical Problem

Patent Literature 1 however discloses the configuration in which four types of polarizer units having mutually different directions of transmission polarization planes are arranged in pixels of the same color of R, G, and B. Thus, in the case of performing the processing for acquiring color intensity information by averaging the intensity of light and the processing for acquiring polarization information by approximation of a sinusoidal function, the resultant color luminance information and polarization information will be information with reduced resolution.

Further, Patent Literature 2 discloses the configuration in which the Bayer filter is necessary to be used as a color mosaic filter and the polarization information is generated using a green pixel provided with four types of polarizers. Thus, if the green component in the photographic object light is small, the polarization information will fail to be acquired.

Thus, the present technology is intended to provide an image processing device and image processing method, capable of acquiring high resolution information from a polarized image including pixels for each of a plurality of polarization components.

Solution to Problem

A first aspect of this technology is an image processing device including: a demosaicing unit configured to use a pixel signal of a target pixel of a polarized image including pixels for each of a plurality of polarization components and a pixel signal of a pixel for each of identical polarization components located near the target pixel to calculate a pixel signal for each polarization component different from the polarization component of the polarized image in the target pixel.

In this technology, the pixel signal for each polarization component is calculated for the target pixel of the polarized image including pixels for each of the plurality of polarization components. In one example, the demosaicing unit performs two-dimensional filtering using pixel signals of pixels located near the target pixel for each identical polarization component and calculates the low frequency component for each polarization component. Furthermore, the demosaicing unit calculates the pixel signal for each polarization component in the target pixel on the basis of the calculated low frequency component for each polarization component and the component information indicating the relationship between the low frequency component of each polarization component of the polarized image and the pixel signal of the target pixel. The demosaicing unit generates the polarized image for each polarization component by using each pixel of the polarized image as the target pixel. In addition, in a case where the polarized image including pixels for each of the plurality of polarization components is a color polarized image, the demosaicing unit uses the pixel signal of the pixel for each identical polarization component located near the target pixel for each color component and calculates a pixel signal for each polarization component for each color component.

Further, the image processing device includes a normal information acquisition unit configured to acquire normal information using the pixel signal of each of the plurality of polarization components that is calculated by the demosaicing unit. In the case where the polarized image is the color polarized image, the normal information acquisition unit calculates luminance for each polarization component by using the pixel signal for each color component that is calculated by the demosaicing unit for each polarization component, and acquires the normal information on the basis of the calculated luminance for each polarization component. Furthermore, white balance of the color polarized image is adjusted, and the normal information acquisition unit uses the pixel signal for each color component, which is calculated by the demosaicing unit using the color polarized image subjected to white balance adjustment, for each polarization component to calculate color difference for each polarization component, and acquires the normal information on the basis of the calculated color difference for each polarization component. The normal information acquisition unit performs fitting to polarization characteristic model using the luminance or color difference for each of the plurality of polarization components and acquires the normal information from the fitted polarization characteristic model.

Further, the image processing device includes a non-polarized image acquisition unit configured to generate a pixel signal of a non-polarized image from a pixel signal for each of a plurality of polarization components that is calculated by the demosaicing unit. In the case where the polarized image is the color polarized image, the non-polarized image acquisition unit calculates the pixel signal of the non-polarized image for each color component by using the pixel signal for each polarization component that is calculated by the demosaicing unit for each color component. The non-polarized image acquisition unit averages the pixel signals for each of the plurality of polarization components and calculates the pixel signal of the non-polarized image.

Furthermore, the image processing device includes a correction pixel information storage unit configured to store correction pixel information including position information of a correction pixel that fails to obtain a pixel signal corresponding to incident light. The demosaicing unit calculates a pixel signal of the correction pixel indicated by the correction pixel information by using a pixel signal of a peripheral pixel having a different polarization component on the basis of the polarization characteristic model of the plurality of polarization components.

A second aspect of this technology is an image processing method including: using a pixel signal of a target pixel of a polarized image including pixels for each of a plurality of polarization components and a pixel signal of a pixel for each of identical polarization components located near the target pixel to calculate a pixel signal for each polarization component different from the polarization component of the polarized image in the target pixel.

Advantageous Effects of Invention

According to the present technology, the use of a pixel signal of a target pixel of a polarized image including pixels for each of a plurality of polarization components and a pixel signal of a pixel for each of identical polarization components located near the target pixel allows the demosaicing for calculating a pixel signal for each polarization component different from a polarization component of a polarized image in the target pixel to be performed. Thus, pixel signals of a plurality of polarization components can be obtained for each pixel, and high resolution information, for example, the pixel signal of normal information or non-polarized image can be easily obtained for each pixel. Moreover, the effects described herein are merely illustrative but not restrictive, or there may be additional advantageous effects.

BRIEF DESCRIPTION OF DRAWINGS

FIG. 5 is a diagram illustrated to describe low-pass filtering.

FIG. 18 is a diagram illustrated to describe low-pass filtering.

FIG. 26 is a diagram illustrated to describe low-pass filtering.

MODE(S) FOR CARRYING OUT THE INVENTION

Modes for carrying out the present technology will be described below. Moreover, the description will be given in the following order.

1. First Embodiment
2. Second Embodiment
3. Third Embodiment
4. Fourth Embodiment
5. Other Embodiments
6. Application Example <1. First Embodiment>

Figure 1:
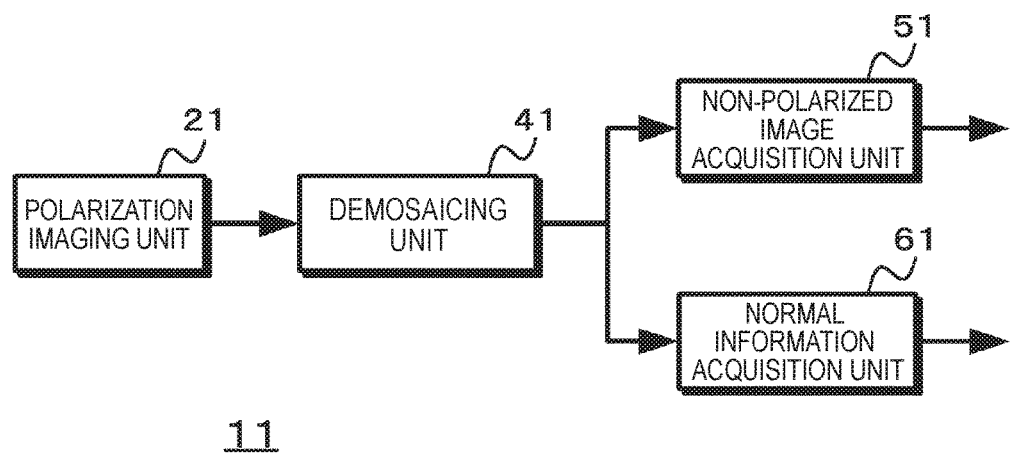
FIG. 1 is a diagram illustrating the configuration of a first embodiment.

FIG. 1 illustrates the configuration of a first embodiment of an image processing device of the present technology. The image processing device 11 includes a polarization imaging unit 21, a demosaicing unit 41, a non-polarized image acquisition unit 51, and a normal information acquisition unit 61.

Figure 2:
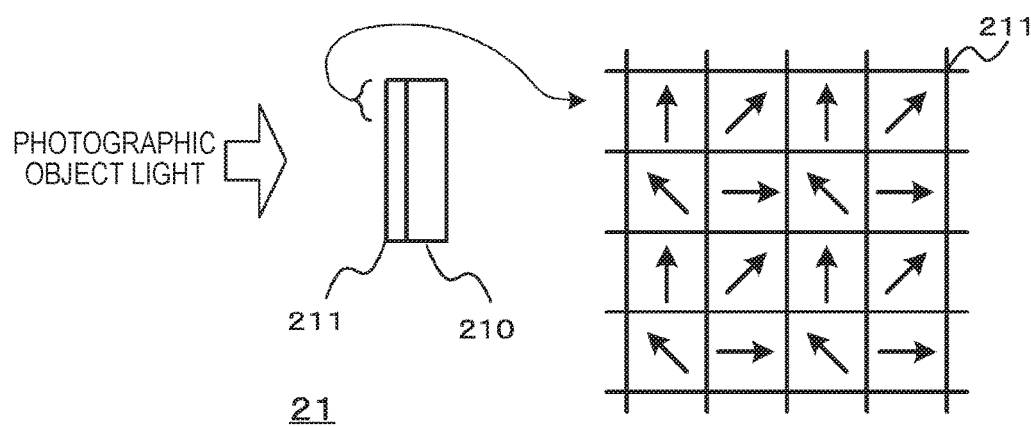
FIG. 2 is a diagram illustrating the configuration of a polarization imaging unit.
Figure 3:
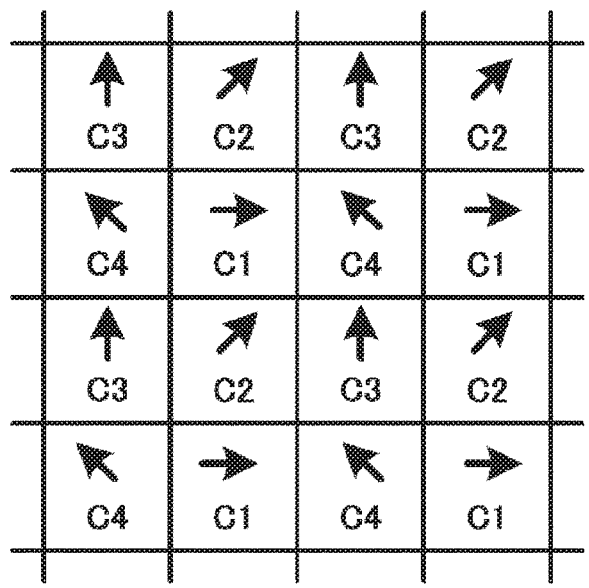
FIG. 3 is a diagram illustrating a polarization component.

The polarization imaging unit 21 generates an image signal of a polarized image including pixels for each of a plurality of polarization components. FIG. 2 illustrates the configuration of the polarization imaging unit. The polarization imaging unit 21 is configured such that a polarization filter 211 having a pixel configuration in three or more polarization directions is arranged on the incident surface of an image sensor 210. Moreover, FIG. 2 illustrates the case where the polarization filter 211, in which each pixel is any one of four different types of polarization directions (polarization directions indicated by arrows), is arranged on the front surface of the image sensor 210. The polarization imaging unit 21 outputs the image signal of the generated polarized image to the demosaicing unit 41. The description will be given on the assumption that four polarization directions are C1 to C4 polarization components, as illustrated in FIG. 3.

Figure 4:
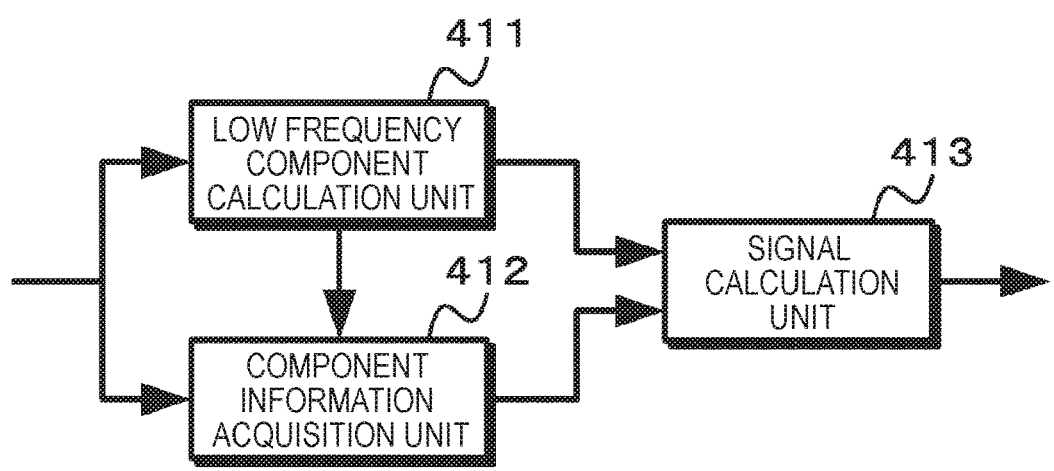
FIG. 4 is a diagram illustrating the configuration of a demosaicing unit.

The demosaicing unit 41 performs the demosaicing using an image signal of a polarized image including pixels for each of a plurality of polarization components that is generated by the polarization imaging unit 21 and generates an image signal for each polarization component. In the demosaicing, by using the pixel signal of a target pixel of the polarized image and the pixel signal of the pixel for each of the identical polarization components located near the target pixel, a pixel signal for each polarization component different from the polarization component of the polarized image in the target pixel is calculated. FIG. 4 illustrates the configuration of the demosaicing unit. The demosaicing unit 41 includes a low frequency component calculation unit 411, a component information acquisition unit 412, and a signal calculation unit 413.

The low frequency component calculation unit 411 calculates a low frequency component for each polarization component by using the pixel signal of the pixel located near the target pixel in the polarized image that is generated by the polarization imaging unit 21 for each of the identical polarization components. The low frequency component calculation unit 411 performs two-dimensional filtering using the pixel signal of the pixel of the identical polarization component located near the target pixel for each polarization component and calculates a low frequency component for each polarization component. FIG. 5 is a diagram illustrated to describe low-pass filtering. The low frequency component calculation unit 411 calculates a low frequency component using, in one example, a two-dimensional weighted filter. In FIG. 5, (a) illustrates pixels used in a two-dimensional filter, and in FIG. 5, (b) illustrates filter coefficients. The low frequency component calculation unit 411 calculates a low frequency component for each polarization component of the target pixel indicated by diagonal lines using a two-dimensional 5×5 tap filter. Moreover, in FIG. 5, (a) illustrates the case where the target pixel is a pixel of a C3 polarization component.

In a case where the low frequency component calculation unit 411 calculates a low frequency component for each polarization component, the low frequency component calculation unit 411 calculates a low frequency component for each polarization component in the target pixel by using the pixel signal of the pixel of the identical polarization component and the filter coefficient corresponding to the pixel within 5×5 taps. Specifically, the low frequency component is calculated by multiplying the signal of the pixel of the identical polarization component by a filter coefficient corresponding to the pixel for each polarization component and by dividing the weighted sum of the multiplication result by the total sum of weights.

As illustrated in (a) of FIG. 5, in a case where the target pixel (x=2, y=2) is the C3 polarization component, the low frequency component calculation unit 411 calculates a low frequency component C3LPF of the C3 polarization component using Equation (1). Moreover, in the following Equations, SCn (x,y) represents a pixel signal of a Cn polarization component at the coordinates (x,y). The low frequency component calculation unit 411 calculates not only the low frequency component SC3LPF of the C3 polarization component in the target pixel but also the low frequency component SC1LPF of the C1 polarization component in the target pixel using Equation (2). Furthermore, the low frequency component calculation unit 411 calculates the low frequency component SC2LPF of the C2 polarization component in the target pixel using Equation (3), and calculates the low frequency component SC4LPF of the C4 polarization component in the target pixel using Equation (4).

$$SC3LPF = \\ ((1*SC3\,(0,0) + 6*SC3\,(2,0) + 1*SC3(4,0) + 6*SC3\,(0,2) + \\ 36*SC3\,(2,2) + 6*SC3(4,2) + 1*SC3(0,4) + \\ 6*SC3\,(2,4) + 1*SC3\,(4,4))/64 \quad (1)$$

$$SC1LPF = ((16*SC1\,(1,1) + \\ 16*SC1\,(3,1) + 16*SC1\,(1,3) + 16*SC1\,(3,3))/64 \quad (2)$$

$$SC2LPF = \\ ((4*SC2\,(1,0) + 4*SC2\,(3,0) + 24*SC2\,(1,2) + 24*SC2\,(3,2) + \\ 4*SC2\,(1,4) + 4*SC2\,(3,4))/64 \quad (3)$$

$$SC4LPF = \\ ((4*SC4\,(0,1) + 24*SC4\,(2,1) + 4*SC4\,(4,1) + 4*SC4\,(0,3) + \\ 24*SC4\,(2,3) + 4*SC4\,(4,3)/64 \quad (4)$$

The low frequency component calculation unit 411 calculates the low frequency components SC1LPF to SC4LPF for each pixel by performing the above-described processing by using each pixel in the polarized image generated by the polarization imaging unit 21 as a target pixel, and outputs them to the component information acquisition unit 412 and the signal calculation unit 413.

The component information acquisition unit 412 acquires component information indicating a relationship between the low frequency component of the polarization component of the polarized image that is calculated by the low frequency component calculation unit 411 for the target pixel in the polarized image and the pixel signal of the target pixel. The component information acquisition unit 412 sets, as the component information, in one example, a gain obtained by setting a value obtained by adding a high-frequency component to the low frequency component of the target pixel as a pixel signal of a target pixel (hereinafter referred to as "high frequency added gain"). In a case where the target pixel is, in one example, a pixel at the coordinates (2,2) illustrated in (a) of FIG. 5, that is, the C3 polarization component, the component information acquisition unit 412 calculates a high frequency added gain SChpg using Equation (5).

$$SChpg = SC3(2,2)/SC3LPF \quad (5)$$

Similarly, in a case where the target pixel is a pixel at the coordinates (3,2), that is, the C2 polarization component, the component information acquisition unit 412 calculates the high frequency added gain SChpg using Equation (6).

$$SChpg = SC2(3,2)/SC2LPF \quad (6)$$

The component information acquisition unit 412 calculates the high frequency added gain SChpg at each pixel position by using each pixel in the polarized image that is generated by the polarization imaging unit 21 as a target pixel, and outputs the calculated high frequency added gain SChpg to the signal calculation unit 413.

Figure 6:
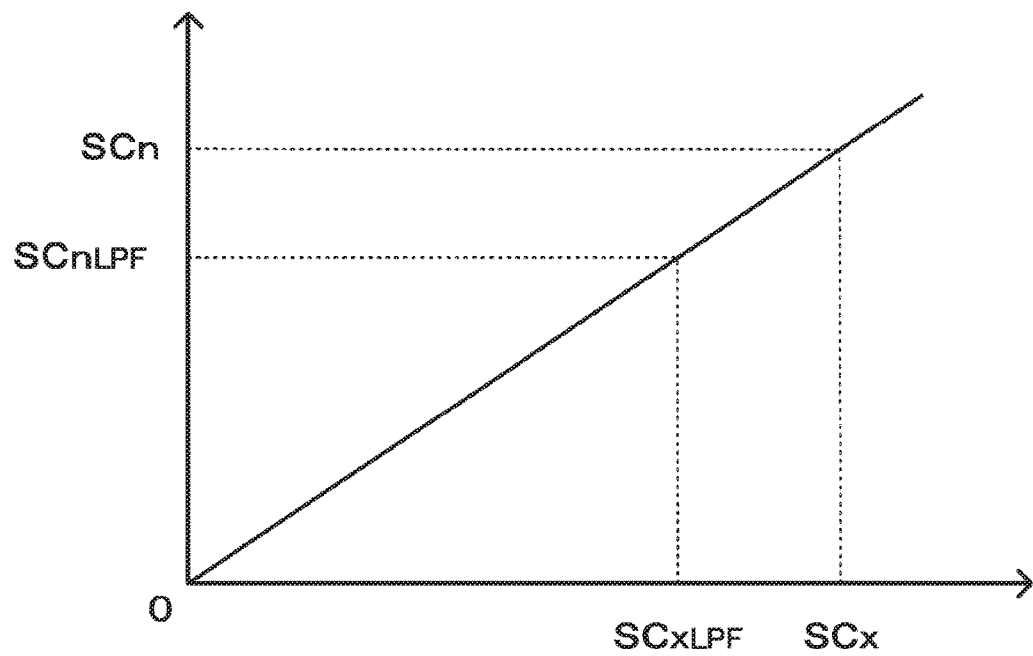
FIG. 6 is a diagram illustrating a correlation between polarization components.

The signal calculation unit 413 calculates a pixel signal for each polarization component in the target pixel on the basis of the low frequency component for each polarization component that is calculated by the low frequency component calculation unit 411 and the component information acquired by the component information acquisition unit 412. The signal calculation unit 413 applies the relationship between the low frequency component of the polarization component of the polarized image of the target pixel and the pixel signal to the relationship between the low frequency component of the other polarization components and the pixel signal of the other polarization component. In other words, the signal calculation unit 413 calculates a pixel signal for each polarization component in the target pixel from the high frequency added gain of the target pixel that is calculated by the component information acquisition unit 412 and the low frequency component for each polarization component of the target pixel that is calculated by the low frequency component calculation unit 411. FIG. 6 illustrates the relationship between polarization components. The signal calculation unit 413 applies the relationship between a pixel signal SCx of the target pixel in the polarized image and a low frequency component SCxLPF to the relationship between a pixel signal SCn (n≠x) of another polarization component in the target pixel and a low frequency component SCnLPF, and calculates a pixel signal SCn. In other words, the signal calculation unit 413 calculates the pixel signal SCn from the high frequency added gain SChpg and the low frequency component SCnLPF on the basis of Equation (7).

$$SCn = SCnLPF * SChpg \quad (7)$$

The case where the target pixel is the coordinates (2,2) in (a) of FIG. 5 is now described. In this case, the signal calculation unit 413 applies the relationship between the pixel signal SC3 of the C3 polarization component and the low frequency component SC3LPF to the relationship between the pixel signal SC1 of the C1 polarization component and the low frequency component SC1LPF, and so calculates the pixel signal SC1 of the C1 polarization component on the basis of Equation (8).

$$SC1 = SC1LPF * SChpg \quad (8)$$
$$= SC1LPF * (SC3(2,2)/SC3LPF)$$

-continued
$$= (16*SC1(1,1) + 16*SC1(3,1) + 16*SC1(1,3) +$$
$$16*SC1(3,3))*SC3(2,2)/(1*SC3(0,0) +$$
$$6*SC3(2,0) + 1*SC3(4,0) + 6*SC3(0,2) +$$
$$36*SC3(2,2) + 6*SC3(4,2) + 1*SC3(0,4) +$$
$$6*SC3(2,4) + 1*SC3(4,4))$$

Similarly, the signal calculation unit 413 applies the relationship between the pixel signal SC3 of the C3 polarization component and the low frequency component SC3LPF to the relationship between the pixel signal SC2 of the C2 polarization component and the low frequency component SC2LPF or the relationship between the pixel signal SC4 of the C4 polarization component and the low frequency component SC4LPF. In other words, the signal calculation unit 413 calculates the pixel signal SC2 of the C2 polarization component and the pixel signal SC4 of the C4 polarization component in the target pixel on the basis of Equations (9) and (10).

$$SC2 = SC2LPF * SChpg = SC2LPF * (SC3(2,2)/SC3LPF) \quad (9)$$

$$SC4 = SC4LPF * SChpg = SC4LPF * (SC3(2,2)/SC3LPF) \quad (10)$$

Figure 7:
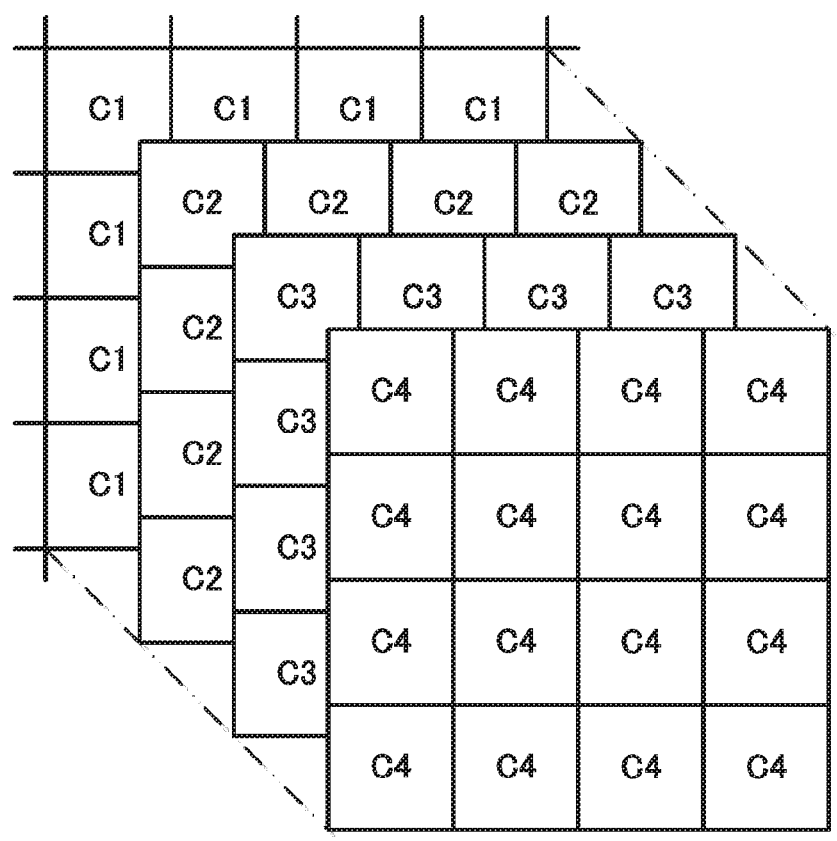
FIG. 7 is a diagram illustrating a polarized image for each polarization component.

Further, the signal calculation unit 413 performs similar processing using each pixel in the polarized image that is generated by the polarization imaging unit 21 as a target pixel, generates a polarized image for each polarization component as illustrated in FIG. 7, and outputs it to the non-polarized image acquisition unit 51 and the normal information acquisition unit 61.

The non-polarized image acquisition unit 51 generates a non-polarized image from the polarized image of each polarization component that is generated by the demosaicing unit 41. The non-polarized image acquisition unit 51 calculates a pixel signal by averaging polarization components for the respective pixels on the basis of Equation (11) for each pixel, thereby generating a grayscale non-polarized image.

$$SC(x,y) = (SC1(x,y) + SC2(x,y) + SC3(x,y) + SC4(x,y))/4 \quad (11)$$

The normal information acquisition unit 61 acquires normal information, for example, azimuth angle, zenith angle, and normal line image on the basis of the polarized image for each polarization component that is generated by the demosaicing unit 41.

Figure 8:
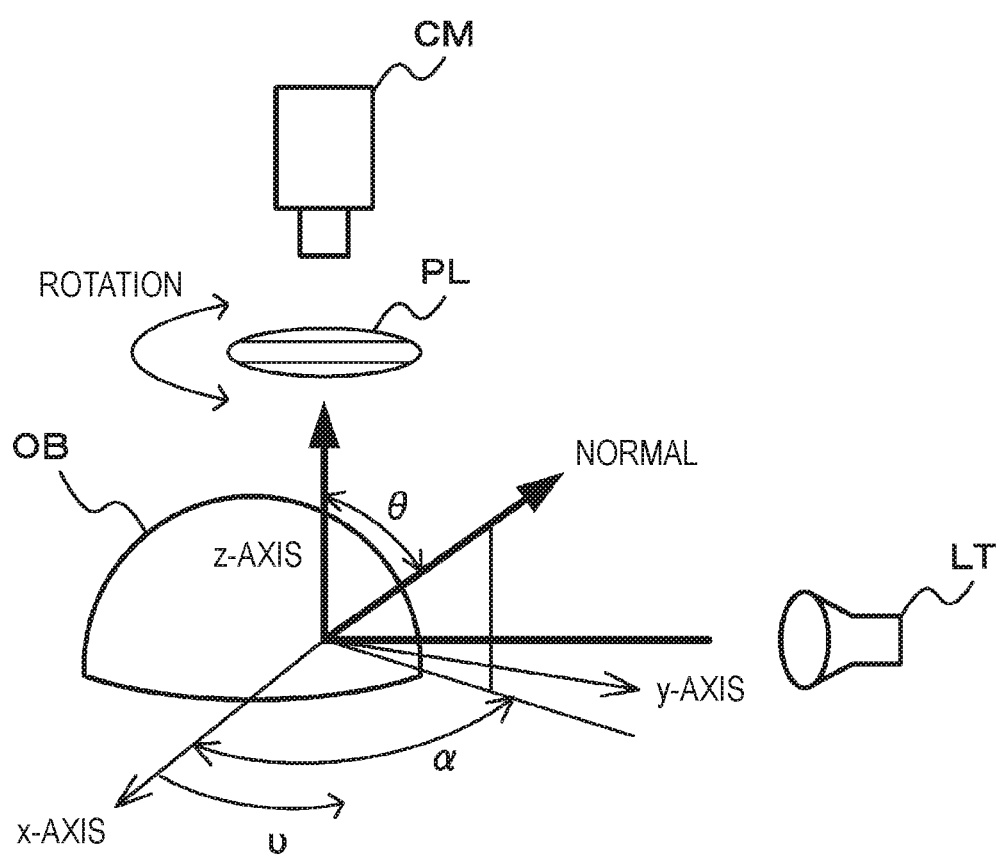
FIG. 8 is a diagram illustrated to describe a relationship between a shape of a photographic object and a polarized image.

The relationship between the shape of a photographic object and the polarized image is now described with reference to FIG. 8. In one example, as illustrated in FIG. 8, a photographic object OB is illuminated with a light source LT, and a camera CM captures the photographic object OB through a polarizing plate PL. In this case, in the captured image, the luminance of the photographic object OB varies depending on the polarization direction of the polarizing plate PL. Moreover, for ease of description, in one example, the image capturing is performed by rotating the polarizing plate PL to acquire a plurality of polarized images, and the maximum luminance is set to Imax and the minimum luminance is set to Imin. In addition, when the x-axis and the y-axis in two-dimensional coordinates are on the plane of the polarizing plate PL, the angle in the y-axis direction relative to the x-axis upon rotating the polarizing plate PL is set to a polarization angle v.

Figure 9:
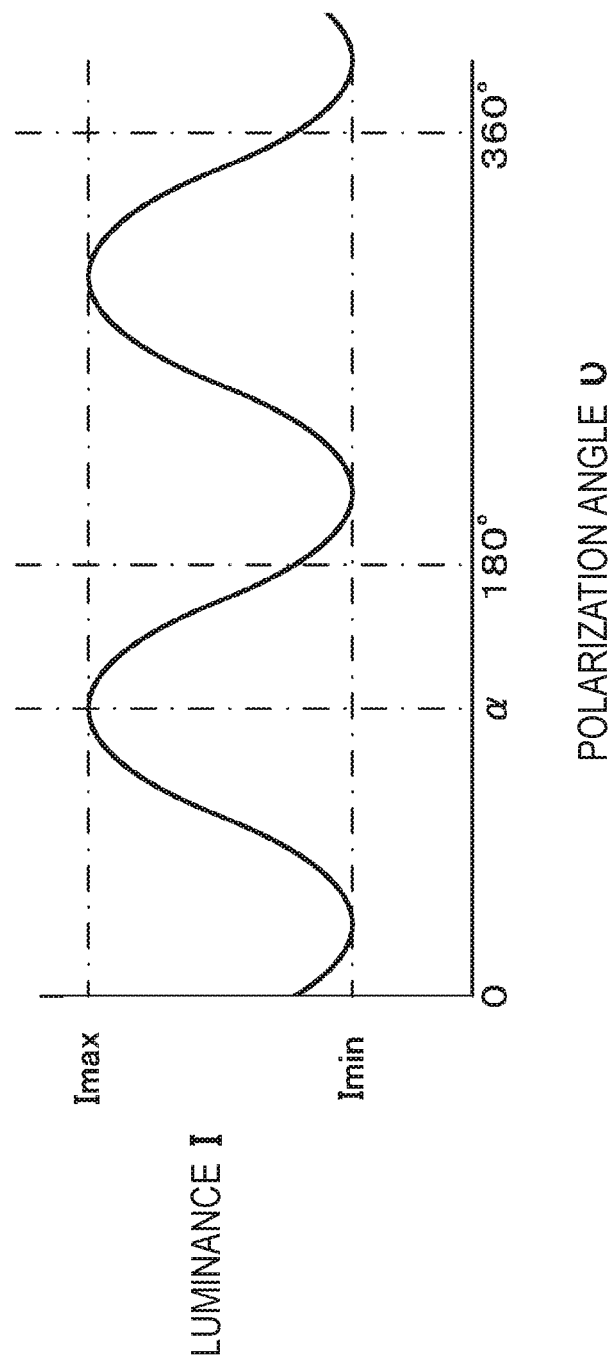
FIG. 9 is a diagram illustrating a relationship between luminance and polarization angle.

The polarizing plate PL, when being rotated by 180 degrees, returns to the original polarization state and so has a 180-degree cycle. In addition, the polarization angle v upon observing the maximum luminance Imax is set to the azimuth angle α. Such a definition makes it possible to represent the luminance I observed upon rotating the polarizing plate PL by Equation (12). Moreover, FIG. 9 illustrates an example of the relationship between luminance and polarization angle. In addition, this example shows a polarization characteristic model of diffuse reflection, and in the case of specular reflection, the azimuth angle is shifted by 90 degrees from the polarization angle.

[Math. 1]

$$I = \frac{I_{max} + I_{min}}{2} + \frac{I_{max} - I_{min}}{2} \cos(2\upsilon - 2\phi) \quad (12)$$

In Equation (12), which is a polarization characteristic model formula representing the relationship between the luminance and the polarization angle, the polarization angle ν is apparent at the time of generating the polarized image, and so the maximum luminance Imax, the minimum luminance Imin, and the azimuth angle α are variables. Thus, fitting the polarization characteristic model formula represented in Equation (12) by using the luminance of the polarized image having three or more polarization directions makes it possible to discriminate the azimuth angle α, which is the polarization angle at which the maximum luminance is obtained, on the basis of the fitted polarization characteristic model formula.

Further, the normal relative to the surface of an object is represented by the polar coordinate system, and the normal is set to the azimuth angle α and the zenith angle θ. Moreover, the zenith angle θ is an angle from the z-axis to the normal, and the azimuth angle α is an angle of the y-axis direction relative to the x-axis as described above. Here, in a case where the minimum luminance Imin and the maximum luminance Imax are obtained upon rotating the polarizing plate PL, the degree of polarization ρ can be calculated on the basis of Equation (13).

[Math. 2]

$$\rho = \frac{I_{max} - I_{min}}{I_{max} + I_{min}} \quad (13)$$

Figure 10:
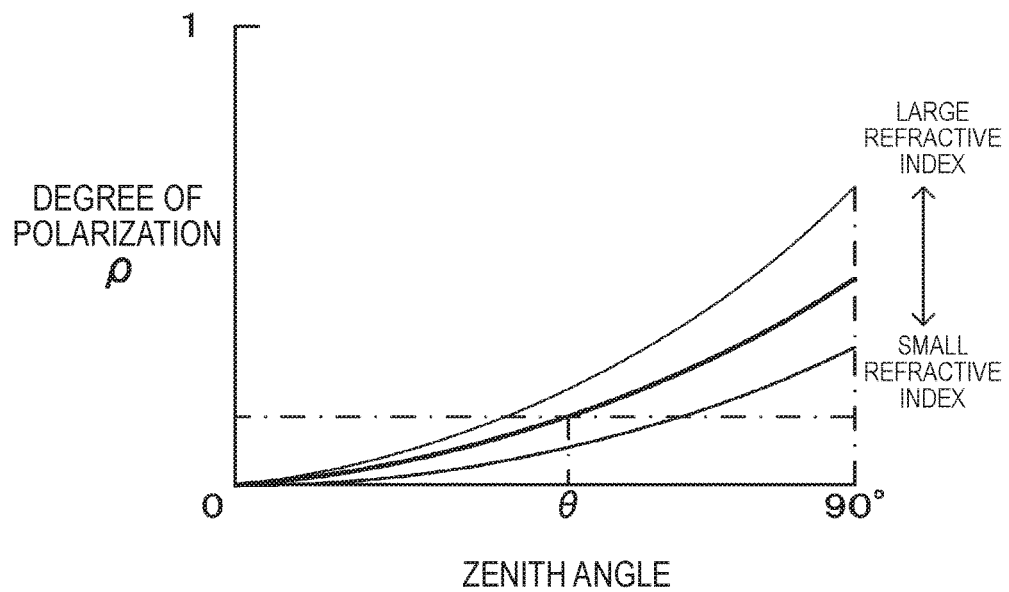
FIG. 10 is a diagram illustrating a relationship between a degree of polarization and zenith angle.

The relationship between the degree of polarization and the zenith angle is known to have, in one example, the characteristics illustrated in FIG. 10 from the Fresnel equations in the case of diffuse reflection. Thus, it is possible to discriminate the zenith angle θ on the basis of the degree of polarization ρ from the characteristics illustrated in FIG. 10. Moreover, the characteristics illustrated in FIG. 10 are merely illustrative and vary depending upon the refractive index or the like of the photographic object. In one example, as the refractive index increases, the degree of polarization increases.

Figure 11:
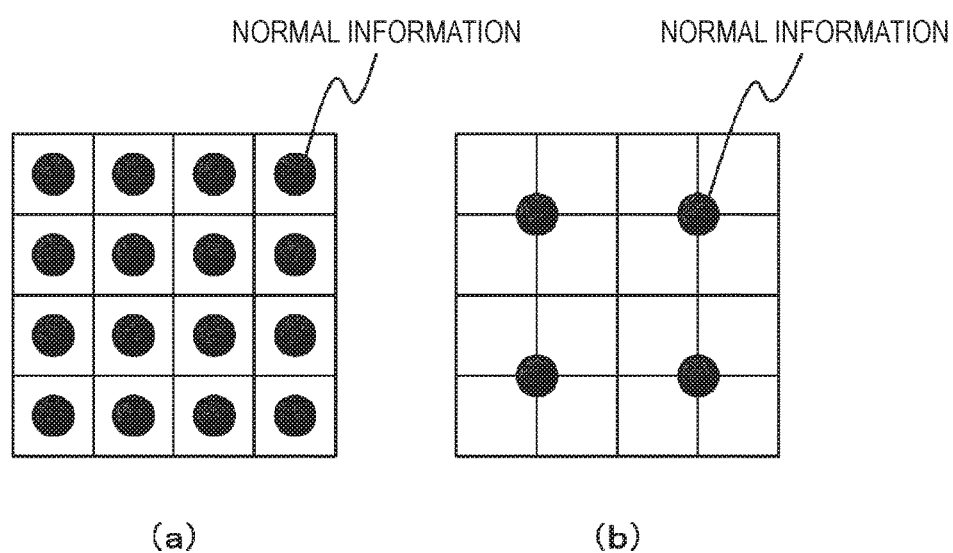
FIG. 11 is a diagram illustrating a situation of acquisition of normal information.

The normal information acquisition unit 61 calculates the azimuth angle α and the zenith angle θ for each pixel in this manner, and sets the calculated azimuth angle α and zenith angle θ to the normal information for each pixel. Thus, it is possible for the normal information acquisition unit 61 to acquire the normal information for each pixel position. FIG. 11 illustrates a situation in which the normal information is acquired. Moreover, black circles indicate pixels from which the normal information can be acquired. In the method in related art, as illustrated in (b) of FIG. 11, normal information is acquired every 2×2 pixel unit. On the other hand, it is possible for the normal information acquisition unit 61 to acquire the normal information for each pixel position as illustrated in (a) of FIG. 11. In addition, the normal information acquisition unit 61 may convert the azimuth angle and the zenith angle into an image and sets it to the normal information. In one example, the normal information acquisition unit 61 sets the normal information to a two-channel image and represents each of the azimuth angle and the zenith angle as a luminance value.

Figure 12:
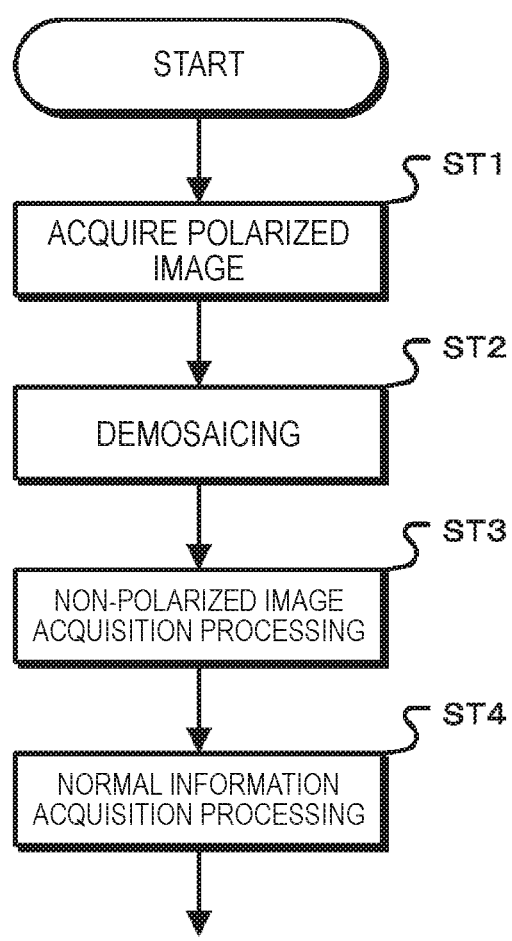
FIG. 12 is a flowchart illustrating the operation of the first embodiment.

FIG. 12 is a flowchart illustrating the operation of the first embodiment. In step ST1, the image processing device 11 acquires a polarized image. The image processing device 11 acquires a polarized image including pixels for each of a plurality of polarization components, and then proceeds to step ST2.

In step ST2, the image processing device 11 performs the demosaicing. The image processing device 11 performs the demosaicing on the polarized image acquired in step ST1, generates a polarized image for each polarization component, and then proceeds to step ST3.

Figure 13:
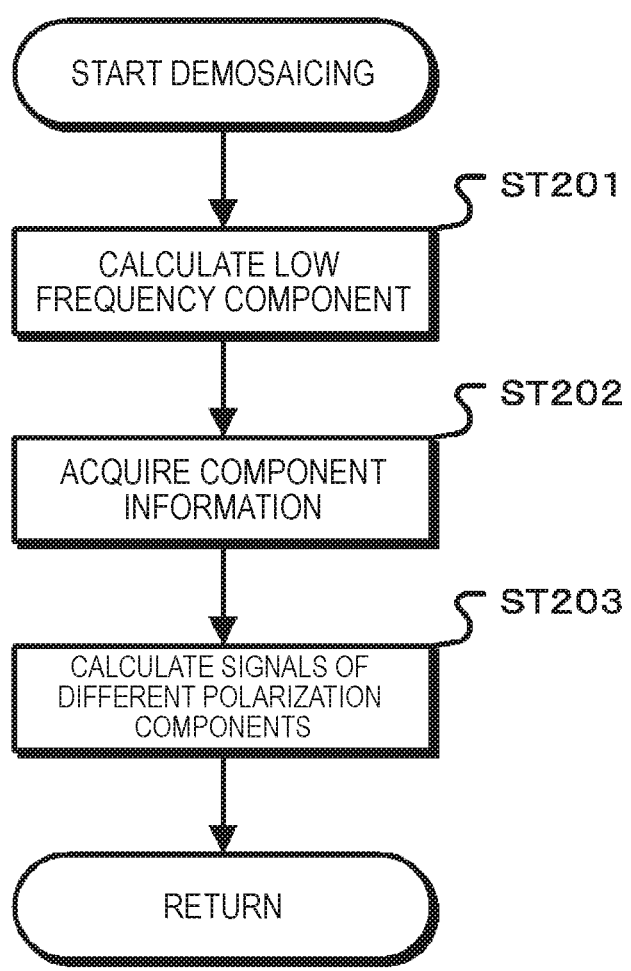
FIG. 13 is a flowchart illustrating demosaicing.

FIG. 13 is a flowchart illustrating the demosaicing. In step ST201, the image processing device 11 calculates a low frequency component. The image processing device 11 performs, in one example, two-dimensional filtering using pixel signals of identical polarization components, calculates a low frequency component for each polarization component in a target pixel, and then proceeds to step ST202.

In step ST202, the image processing device 11 acquires component information. The image processing device 11 acquires component information indicating the relationship between the low frequency component of the polarization component of the polarized image in the target pixel and the pixel signal of the target pixel, and then proceeds to step ST203.

In step ST203, the image processing device 11 calculates signals of different polarization components. The image processing device 11 generates a pixel signal for each polarization component in the target pixel on the basis of the component information acquired in step ST202 and the low frequency component for each polarization component that is calculated in step ST201. In addition, the image processing device 11 performs the processing in steps ST201 to ST203 for each pixel of the polarized image acquired in step ST1 and generates, for each polarization component, a polarized image indicating the polarization component for each pixel, and then proceeds to step ST3 of FIG. 12.

In step ST3, the image processing device 11 performs non-polarized image acquisition processing. In one example, the image processing device 11 averages the polarization component for each pixel using the polarized image for each polarization component that is obtained by performing the demosaicing in step ST2, acquires a non-polarized image by setting the averaged pixel signal as the pixel signal of the relevant pixel, and then proceeds to step ST4.

In step ST4, the image processing device 11 performs normal information acquisition processing. The image processing device 11 performs the fitting to a polarization characteristic model formula for each pixel by using the polarized image for each polarization component that is obtained by performing the demosaicing in step ST2, acquires the azimuth angle or zenith angle on the basis of the fitted polarization characteristic model formula, and sets it as the normal information. In addition, the azimuth angle and the zenith angle may be imaged and may be set as the normal information.

As described above, according to the first embodiment, a pixel signal for each polarization component is calculated for each pixel of a polarized image including pixels for each of a plurality of polarization components, and so it is possible for the demosaicing unit to generate a polarized image of each polarization component without causing deterioration in resolution. In addition, the use of the polarized image of each polarization component that is generated by the demosaicing unit makes it possible to generate a non-polarized image without causing deterioration in resolution. Furthermore, the calculation of the pixel signals of plurality of polarization components for each pixel makes it possible to acquire the normal information for each pixel.

<2. Second Embodiment>

A second embodiment is now described. In the first embodiment described above, the case where the polarization imaging unit 21 generates a black-and-white polarized image is described, but in the second embodiment, a case of generating a color polarized image will be described.

Figure 14:
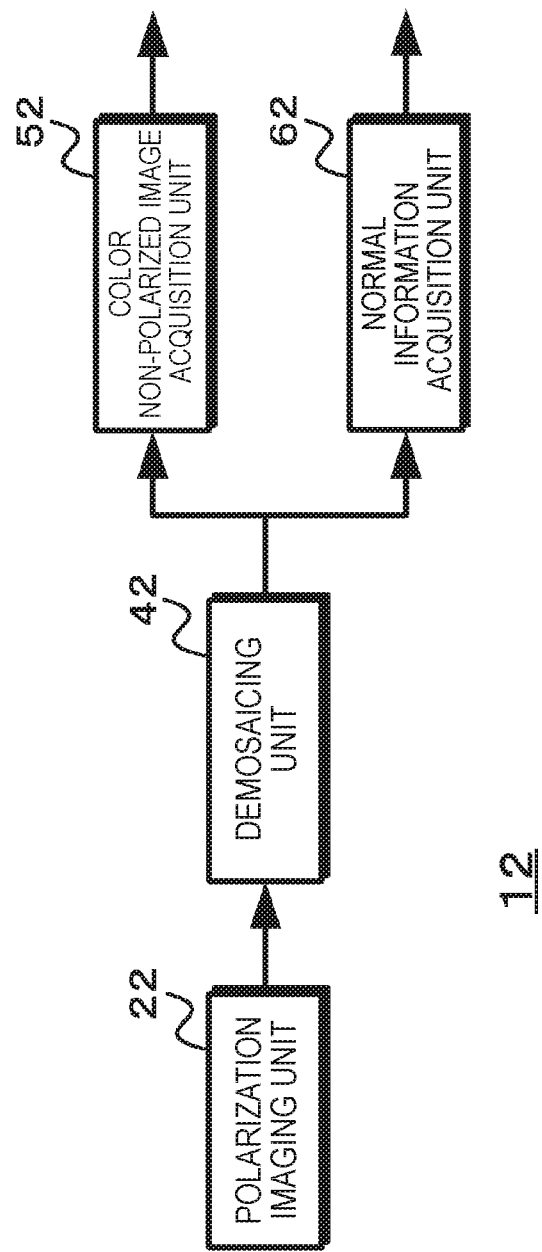
FIG. 14 is a diagram illustrating the configuration of a second embodiment.

FIG. 14 illustrates the configuration of a second embodiment of the image processing device of the present technology. The image processing device 12 includes a polarization imaging unit 22, a demosaicing unit 42, a color non-polarized image acquisition unit 52, and a normal information acquisition unit 62.

Figure 15:
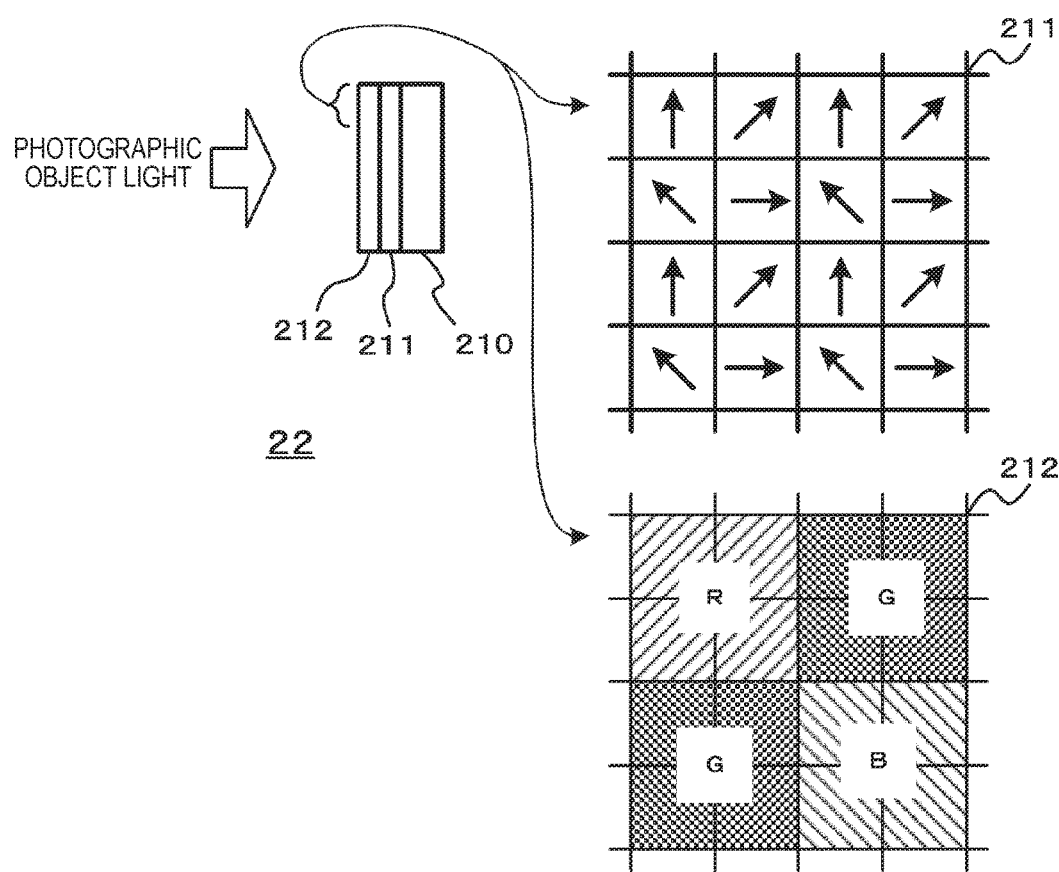
FIG. 15 is a diagram illustrating the configuration of a polarization imaging unit.
Figure 16:
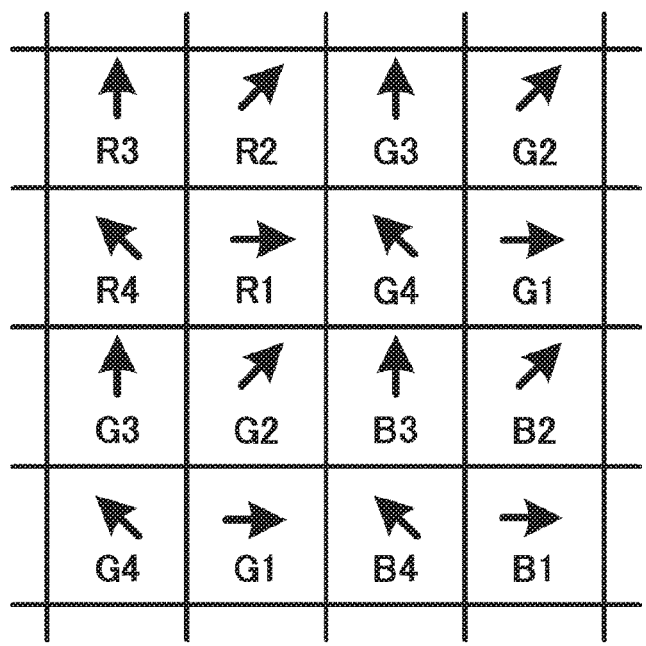
FIG. 16 is a diagram illustrating a polarization component.

The polarization imaging unit 22 generates an image signal of a color polarized image including pixels for each of a plurality of polarization components. FIG. 15 illustrates the configuration of the polarization imaging unit. The polarization imaging unit 22 is configured such that a polarization filter 211 having a pixel configuration in three or more polarization directions is arranged on the incident surface of the image sensor 210. Moreover, FIG. 15 illustrates the case where the polarization filter 211, in which each pixel is any one of four different types of polarization directions (polarization directions indicated by arrows), is arranged on the front surface of the image sensor 210. In addition, a color mosaic filter 212 is provided on the incident surface side of the polarization filter 211 or on the side of the image sensor. The color mosaic filter 212 is an array in which 2×2 pixels that are set to one color component unit and 2×2 color component units that include one red component unit, one blue component unit, and two green component units are repeatedly provided. The polarization imaging unit 22 outputs the image signal of the generated color polarized image to the demosaicing unit 42. The following description will be given on the assumption that four polarization directions of the red component are referred to as R1 to R4 polarization components, four polarization directions of the blue component are referred to as B1 to B4 polarization components, and four polarization directions of the green component are referred to as G1 to G4 polarization components, as illustrated in FIG. 16.

The demosaicing unit 42 performs the demosaicing using an image signal of a color polarized image including pixels for each of a plurality of polarization components that is generated by the polarization imaging unit 22, and generates, for each color component, an image signal for each polarization component. In the demosaicing, a pixel signal of a target pixel of a polarized image and a pixel signal of a pixel for each of the identical polarization components located near the target pixel are used for each color component, and a pixel signal for each polarization component in the target pixel is calculated for each color component.

Figure 17:
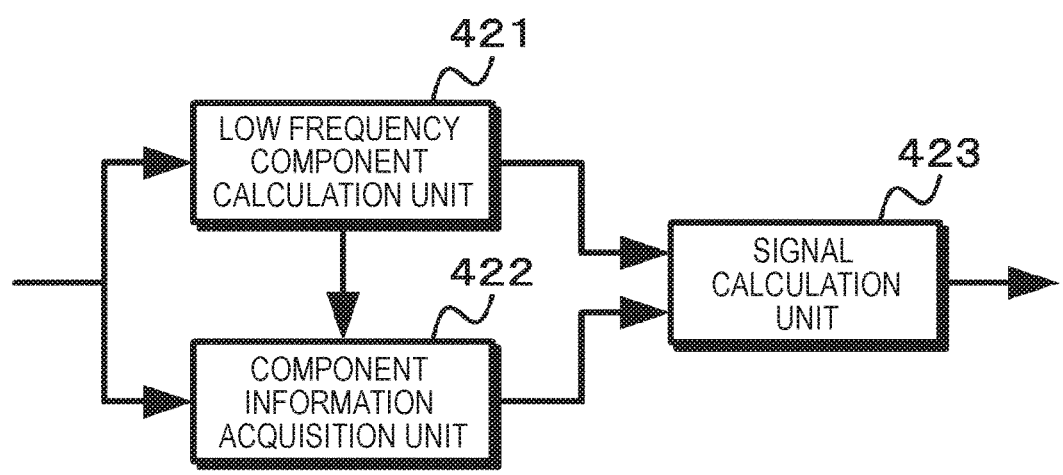
FIG. 17 is a diagram illustrating the configuration of a demosaicing unit.

FIG. 17 illustrates the configuration of the demosaicing unit. The demosaicing unit 42 includes a low frequency component calculation unit 421, a component information acquisition unit 422, and a signal calculation unit 423.

Figure 18:
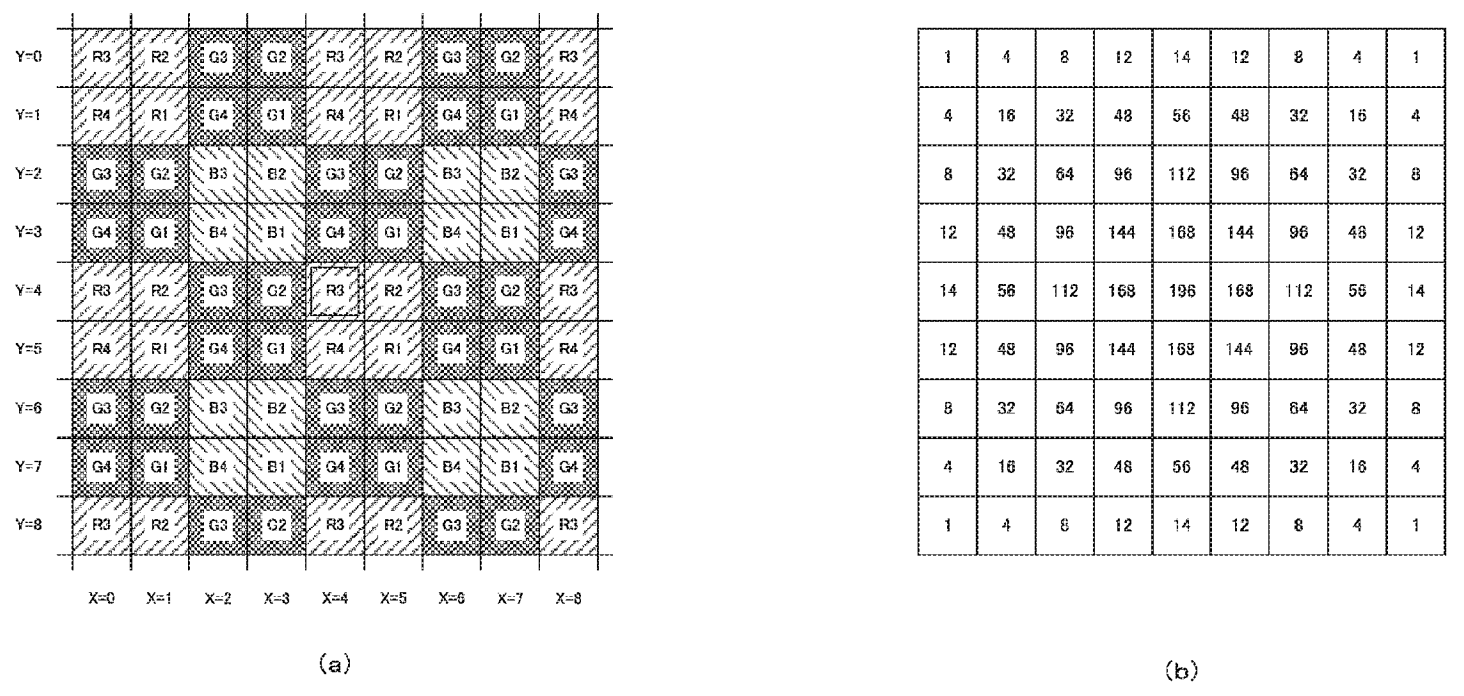

The low frequency component calculation unit 421 uses the pixel signal of the pixel located near the target pixel in the color polarized image generated by the polarization imaging unit 22 for each color component and for each of the identical polarization components, and so calculates, for each color component, a low frequency component for each polarization component. The low frequency component calculation unit 421 performs the two-dimensional filtering using, for each color component, a pixel signal of pixels of the identical polarization component located near the target pixel for each polarization component for each color component, and outputs a low frequency component for each polarization component. FIG. 18 is a diagram illustrated to describe the low-pass filtering. The low frequency component calculation unit 421 calculates the low frequency component using, in one example, a two-dimensional weighted filter. In FIG. 18, (a) illustrates pixels used in the two-dimensional filter, and in FIG. 18, (b) illustrates filter coefficients. The low frequency component calculation unit 421 calculates, for each color component, a low frequency component for each polarization component in the target pixel indicated by a double-line frame using, in one example, a 9×9 tap two-dimensional filter. Moreover, in FIG. 18. (a) illustrates the case where the target pixel is a pixel of the R3 polarization component.

In the case where the low frequency component calculation unit 421 calculates, for each color component, a low frequency component for each polarization component, the low frequency component calculation unit 421 calculate a low frequency component for each polarization component in the target pixel for each color component by using the pixel signal of pixels of the identical polarization component and color component and using a filter coefficient corresponding to a pixel within 9×9 taps. Specifically, for each polarization component, the signal of the pixel of the identical color component and polarization component is multiplied by the filter coefficient corresponding to the pixel, and the weighted sum of the multiplication result is divided by the total sum of the weights to calculate the low frequency component.

As illustrated in (a) of FIG. 18, in the case where the target pixel (x=4, y=4) is the R3 polarization component, the low frequency component calculation unit 421 calculates the low frequency component R3LPF of the R3 polarization component using Equation (14). Moreover, in Equations described below, SRn (x,y) represents the pixel signal of the Rn polarization component at the coordinates (x,y), SGn (x,y) represents the pixel signal of the Gn polarization component at the coordinates (x,y), and SBn (x,y) represents the pixel signal of the Bn polarization component at the coordinates (x,y).

The low frequency component calculation unit 421 calculates not only the low frequency component SR3LPF of the R3 polarization component in the target pixel but also the low frequency component SR1LPF of the R1 polarization component in the target pixel using Equation (15). Furthermore, the low frequency component calculation unit 421 calculates the low frequency component SR2LPF of the R2 polarization component in the target pixel using Equation (16) and calculates the low frequency component SR4LPF of the R4 polarization component in the target pixel using Equation (17).

$$SR3LPF = \quad (14)$$
$$(1*SR3\,(0,0)+14*SR3\,(4,0)+1*SR3\,(8,0)+14*SR3\,(0,4)+$$
$$196*SR3\,(4,4)+14*SR3\,(8,4)+1*SR3\,(0,8)+$$
$$14*SR3\,(4,8)+1*SR3\,(8,8))/256$$

$$SR1LPF = (16*SR1\,(1,1)+48*SR1\,(5,1)+ \quad (15)$$
$$48*SR1\,(1,5)+144*SR1\,(5,5))/256$$

$$SR2LPF = (4*SR2\,(1,0)+12*SR2\,(5,0)+56*SR2\,(1,4)+ \quad (16)$$
$$168*SR2\,(5,4)+4*SR2\,(1,8)+12*SR2\,(5,8))/256$$

$$SR4LPF = \quad (17)$$
$$(4*SR4\,(0,1)+56*SR4\,(4,1)+4*SR4\,(8,1)+12*SR4\,(0,5)+$$
$$168*SR4\,(4,5)+12*SR4\,(8,5))/256$$

Further, the low frequency component calculation unit 421 calculates the low frequency component for each polarization component not only for the red component but also for the green and blue components in the target pixel. In one example, the low frequency component SG3LPF of the G3 polarization component in the target pixel is calculated using Equation (18), and the low frequency component SB3LPF of the B3 polarization component in the target pixel is calculated using Equation (19). In addition, the low frequency component calculation unit 421 similarly calculates low frequency components for other polarization components of the green component and the blue component.

$$SG3LPF = \quad (18)$$
$$(8*SG3\,(2,0)+8*SG3\,(6,0)+8*SG3\,(0,2)+112*SG3\,(4,2)+$$
$$8*SG3\,(8,2)+112*SG3\,(2,4)+112*SG3\,(6,4)+$$
$$8*SG3\,(0,6)+112*SG3\,(4,6)+8*SG3\,(8,6)+$$
$$8*SG3\,(2,8)+8*SG3\,(6,8))/512$$

$$SB3LPF = \quad (19)$$
$$(64*SB3\,(2,2)+64*SB3\,(6,2)+64*SB3\,(2,6)+64*SB3\,(6,6))$$
$$/256$$

The low frequency component calculation unit 421 performs the processing described above by using each pixel in the polarized image generated by the polarization imaging unit 22 as a target pixel and calculates low frequency components SR1LPF to SR4LPF, SG1LPF to SG4LPF, and SB1LPF to SB4LPF for each pixel. The low frequency component calculation unit 421 outputs the calculated low frequency component to the component information acquisition unit 422 and the signal calculation unit 423.

The component information acquisition unit 422 acquires component information indicating a relationship between the low frequency component of the polarization component of the polarized image that is calculated by the low frequency component calculation unit 421 for the target pixel in the polarized image and the pixel signal of the target pixel, in a similar manner to the component information acquisition unit 412 described above. The component information acquisition unit 422 sets, as the component information, in one example, a high frequency added gain obtained by setting a value obtained by adding a high-frequency component to the low frequency component of the target pixel as a pixel signal of a target pixel. In a case where the target pixel is, in one example, a pixel at the coordinates (4,4) illustrated in (a) of FIG. 18, the component information acquisition unit 422 calculates a high frequency added gain SDhpg using Equation (20).

$$SDhpg = SR3(4,4)/SR3LPF \quad (20)$$

Similarly, in a case where the target pixel is a pixel at the coordinates (3,4), the component information acquisition unit 422 calculates the high frequency added gain SDhpg using Equation (21).

$$SDhpg = SG2(3,4)/SG2LPF \quad (21)$$

The component information acquisition unit 422 calculates the high frequency added gain SChpg at each pixel position by using each pixel in the color polarized image that is generated by the polarization imaging unit 22 as a target pixel, and outputs the calculated high frequency added gain SChpg to the signal calculation unit 423.

The signal calculation unit 423 calculates a pixel signal for each polarization component in the target pixel for each color component, on the basis of the low frequency component for each polarization component and for each color component that is calculated by the low frequency component calculation unit 421 and on the basis of the component information acquired by the component information acquisition unit 422.

The signal calculation unit 423 applies the relationship between the low frequency component of the polarization component of the polarized image in the target pixel and the pixel signal to the relationship between the low frequency component of the other polarization component in the target pixel and the pixel signal of the other polarization component, and so calculates a pixel signal for each polarization component in the target pixel. Furthermore, the signal calculation unit 423 calculates the pixel signal for each polarization component in the target pixel for each color component, using the relationship between the low frequency component of the polarization component of the polarized image in the target pixel and the pixel signal. The signal calculation unit 423 calculates the pixel signal SRn (SGn, SBn) from the high frequency added gain SDhpg and the low frequency component SRnLPF (SGnLPF, SBnLPF) on the basis of Equations (22) to (24).

$$SRn = SRnLPF * SDhpg \quad (22)$$

$$SGn = SGnLPF * SDhpg \quad (23)$$

$$SBn = SBnLPF * SDhpg \quad (24)$$

In one example, in a case where the target pixel is the coordinates (4,4) in (a) of FIG. 18, the signal calculation unit 423 calculates the pixel signal SG2 of the G2 polarization component in the target pixel on the basis of Equation (25).

$$\begin{aligned}SG2 =\ & SG2LPF*SDhpg \quad (25)\\ =\ & SG2LPF*(SR3\,(4,4)/SR3LPF)\\ =\ & (12*G2\,(3,0)+4*G2\,(7,0)+32*G2\,(1,2)+96*\\ & G2\,(5,2)+168*G2\,(3,4)+56*G2\,(7,4)+32*\\ & G2\,(1,6)+96*G2\,(5,6)+12*G2\,(3,8)+\\ & 4*G2\,(7,8))/512*R3\,(2,2)/(1*R3\,(0,0)+\\ & 14*R3\,(4,0)+1*R3\,(8,0)+14*R3\,(0,4)+\\ & 196*R3\,(4,4)+14*R3\,(8,4)+1*R3\,(0,8)+\\ & 14*R3\,(4,8)+1*R3\,(8,8))*256\end{aligned}$$

Figure 19:
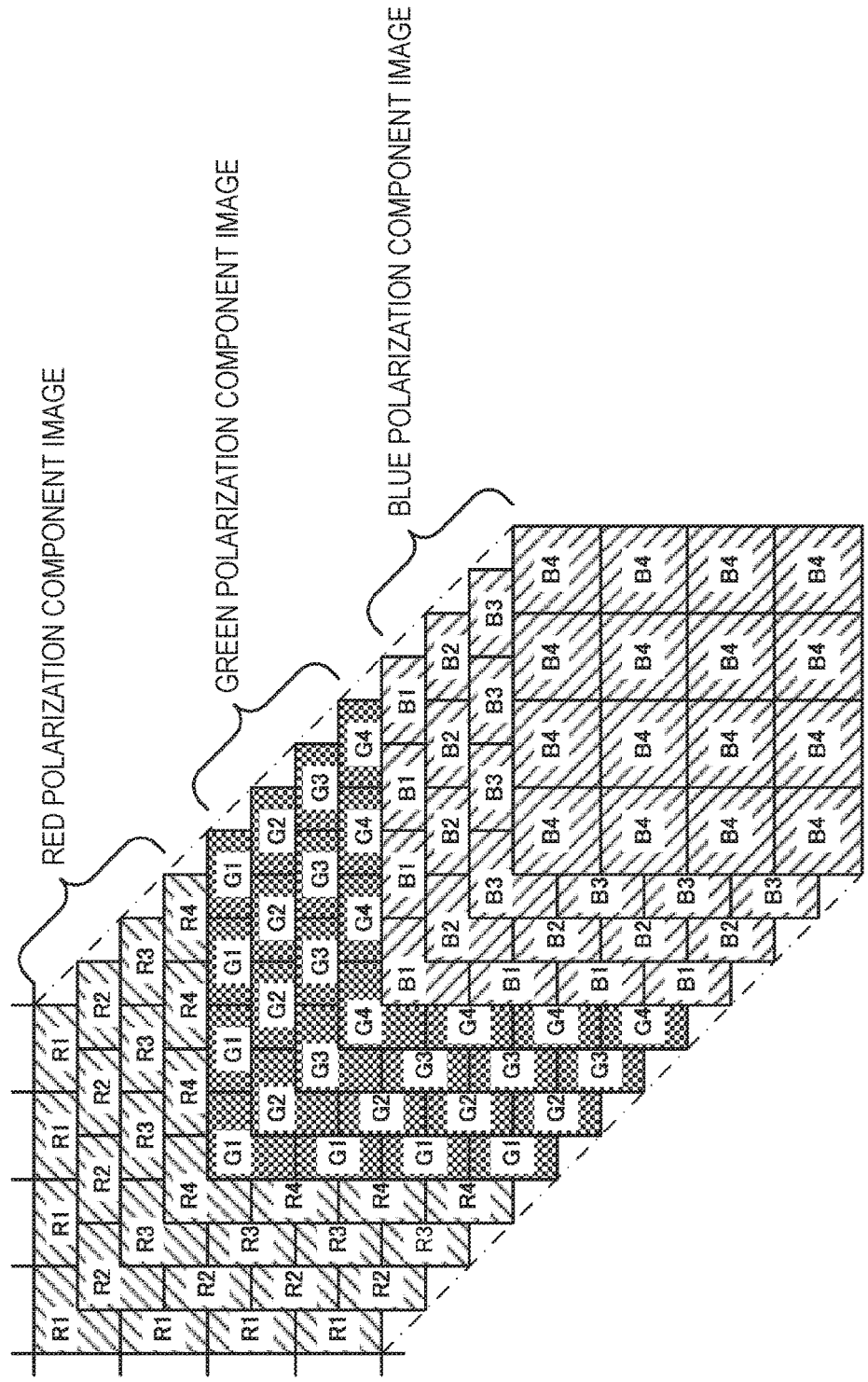
FIG. 19 is a diagram illustrating a polarized image for each polarization component that is generated for each color component.

Further, the signal calculation unit 423 performs similar processing by using each pixel in the color polarized image generated by the polarization imaging unit 22 as a target pixel, generates a polarized image for each polarization component for each color component as illustrated in FIG. 19, and outputs it to the non-polarized image acquisition unit 52 and the normal information acquisition unit 62.

Figure 20:
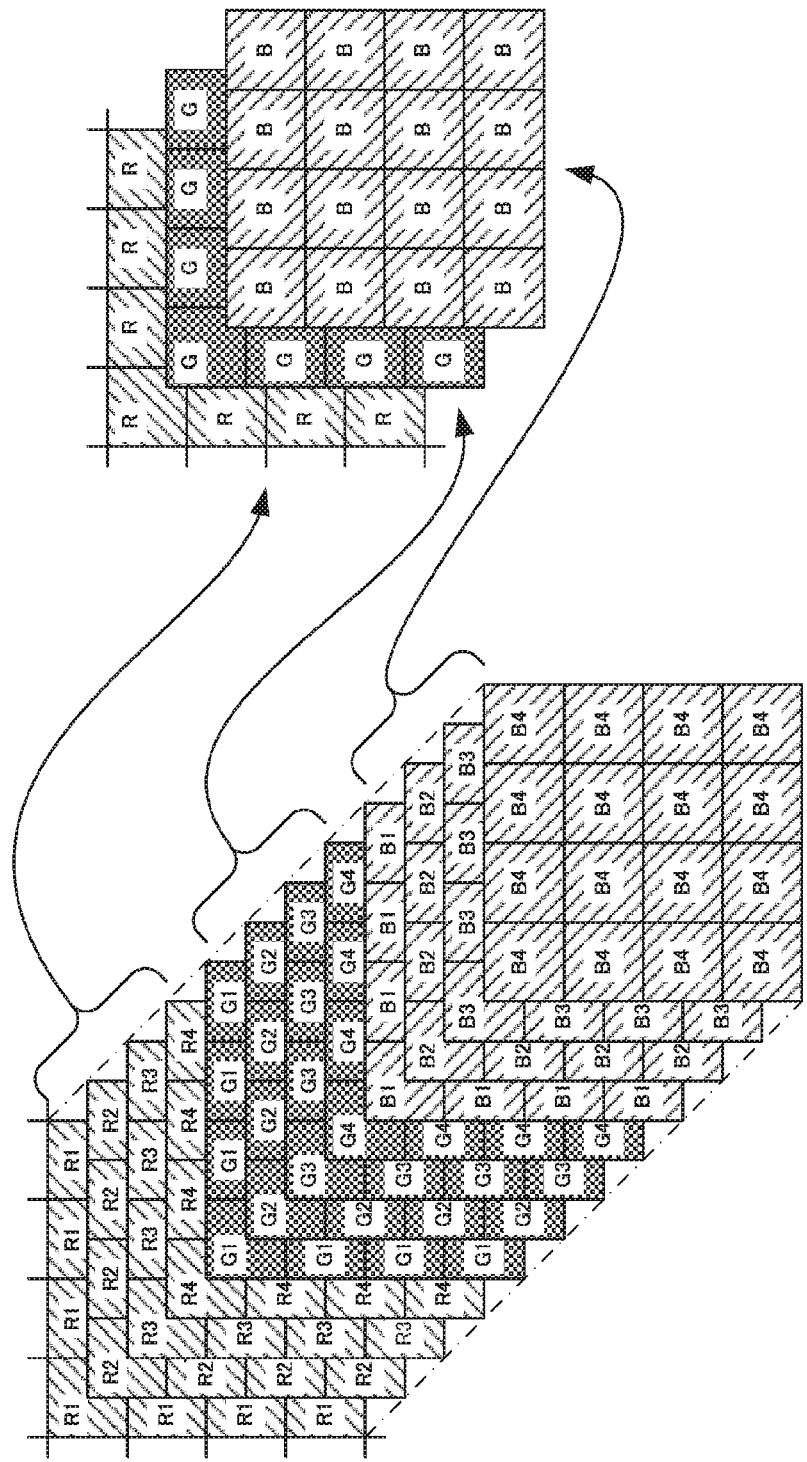
FIG. 20 is a diagram illustrating a non-polarized image for each color.

The color non-polarized image acquisition unit 52 generates a non-polarized image from the polarized image of each polarization component that is generated for each color component in the demosaicing unit 42. The color non-polarized image acquisition unit 52 performs the arithmetic operation of Equations (26) to (28) for each pixel, averages pixel signals of four different polarization components, calculates a non-polarized pixel signal for each color component, and generates a non-polarized image for each color component as illustrated in FIG. 20.

$$SR(x,y)=(SR1(x,y)+SR2(x,y)+SR3(x,y)+SR4(x,y))/4 \quad (26)$$

$$SG(x,y)=(SG1(x,y)+SG2(x,y)+SG3(x,y)+SG4(x,y))/4 \quad (27)$$

$$SB(x,v)=(SB1(x,v)+SB2(x,v)+SB3(x,y)+SB4(x,y))/4 \quad (28)$$

The normal information acquisition unit 62 acquires normal information on the basis of the color polarized image for each polarization component that is generated by the demosaicing unit 42.

In the demosaicing unit 42, a color polarized image is generated for each polarization component and for each color component. Thus, the normal information acquisition unit 62 performs the arithmetic operation of Equation (29) for each polarization component for the pixel (x,y) of the color polarized image generated by the demosaicing unit 42, and calculates the luminance I for each polarization component.

$$I(x,y)=R(x,y)+2*G(x,y)+B(x,y) \quad (29)$$

The normal information acquisition unit 62 acquires the normal information by performing processing similar to that of the normal information acquisition unit 61 of the first embodiment by using the luminance calculated for each polarization component.

Figure 21:
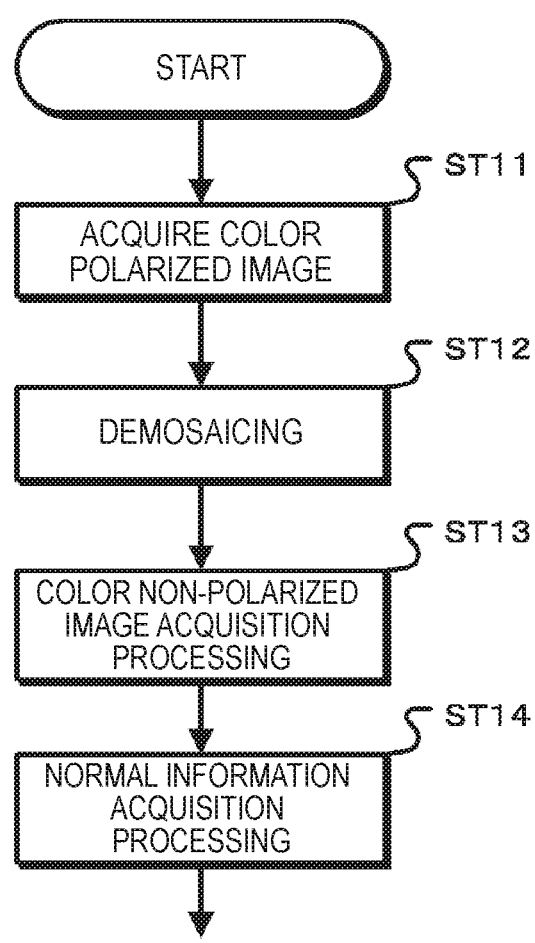
FIG. 21 is a flowchart illustrating the operation of the second embodiment.

FIG. 21 is a flowchart illustrating the operation of the second embodiment. In step ST11, the image processing device 12 acquires a color polarized image. The image processing device 12 acquires a color polarized image including pixel signals of polarization components of three or more directions, and then proceeds to step ST12.

In step ST12, the image processing device 12 performs the demosaicing. The image processing device 12 performs the demosaicing on the color polarized image acquired in step ST12, generates a polarized image for each color component for each polarization component, and then proceeds to step ST13.

In step ST13, the image processing device 12 performs the color non-polarized image acquisition processing. The image processing device 12 calculates the average signal for each color component of the polarization component for each pixel by using the image of each color for each polarization component that is obtained by the demosaicing in step ST12 and sets the calculated average signal as the pixel signal of the pixel. The image processing device 12 performs such processing to acquire an image for each of non-polarized color component, and then proceeds to step ST14.

In step ST14, the image processing device 12 performs the normal information acquisition processing. The image processing device 12 uses the image for each polarization component for each color component that is obtained by performing the demosaicing in step ST12 and calculates the luminance for each polarization component by using the pixel signals for each color component of the identical polarization component for each pixel. In addition, for each pixel, fitting to the model formula is performed using the luminance of each polarization component, and the azimuth angle or the zenith angle is acquired on the basis of the model formula indicating the relationship between the luminance and the polarization angle, and so the azimuth angle or the zenith angle is set as the normal information. In addition, the azimuth angle and the zenith angle may be imaged and may be set as the normal information.

As described above, according to the second embodiment, for each pixel of a color mosaic color polarized image including pixels for each of a plurality of polarization components, a pixel signal for each polarization component is calculated for each color component, and the polarized image of each polarization component can be generated in the demosaicing unit for each color component without causing deterioration in resolution. In addition, a pixel signal for each color component of a plurality of polarization components is generated for each pixel, and so a non-polarized image for each color component can be obtained without deterioration in resolution. Furthermore, in the demosaicing unit, a pixel signal for each of the plurality of polarization components and color components can be calculated for each pixel, and so the normal information can be acquired for each pixel.

<3. Third Embodiment>

A third embodiment is now described. In the third embodiment, a color polarized image is generated, which is similar to the third embodiment. In addition, in the third embodiment, the case of acquiring the normal information using color difference will be described.

Figure 22:
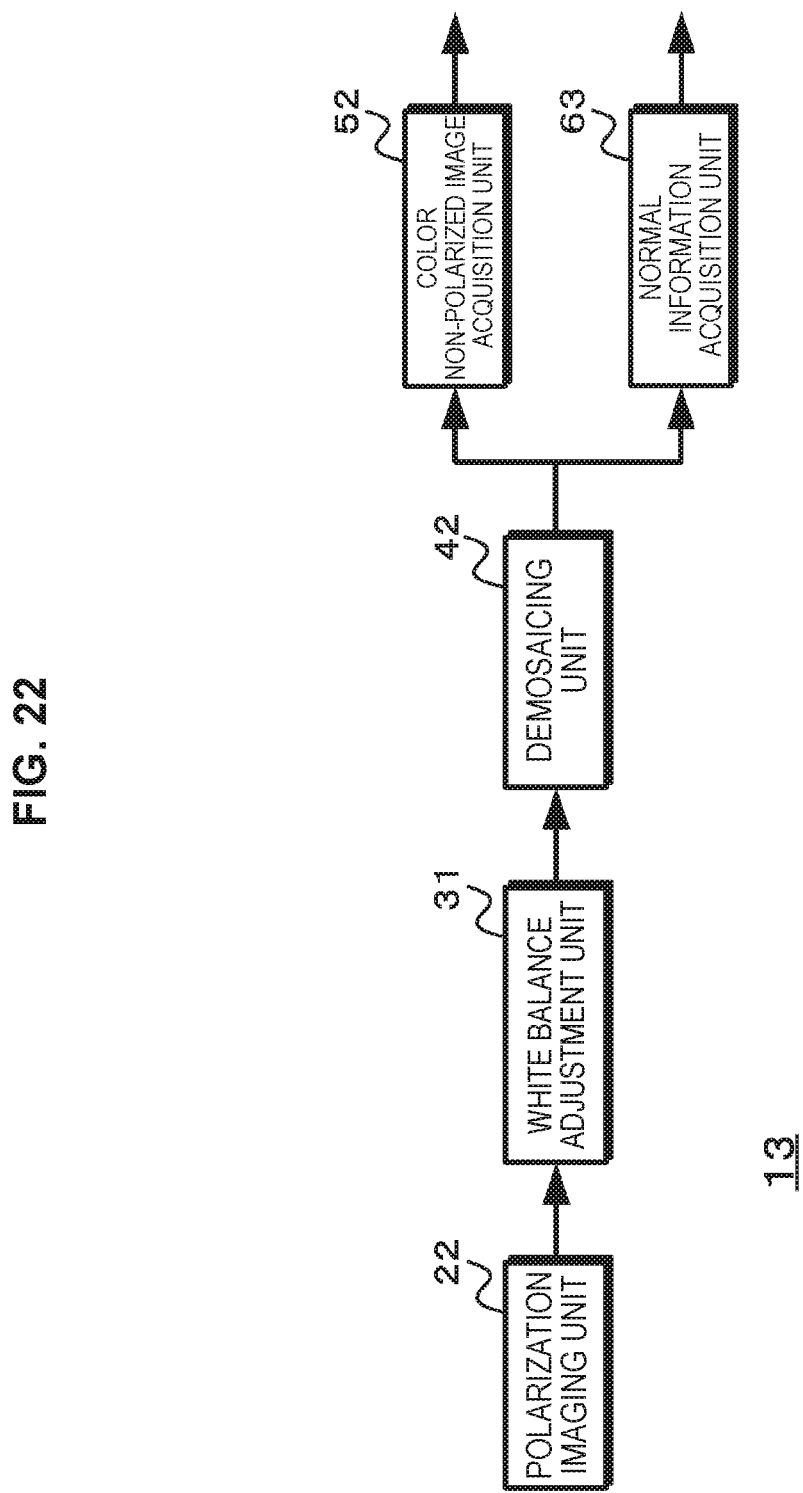
FIG. 22 is a diagram illustrating the configuration of a third embodiment.

FIG. 22 illustrates the configuration of the third embodiment of the image processing device of the present technology. The image processing device 13 includes a polarization imaging unit 22, a white balance adjustment unit 31, a demosaicing unit 42, a color non-polarized image acquisition unit 52, and a normal information acquisition unit 63.

The polarization imaging unit 22 is configured in a similar manner to the second embodiment, and generates an image signal of a color polarized image including pixels for each of a plurality of polarization components. The polarization imaging unit 22 outputs the image signal of the generated color polarized image to the white balance adjustment unit 31.

The white balance adjustment unit 31 performs white balance adjustment on the color polarized image generated by the polarization imaging unit 22. When, in one example, a white photographic object is captured by the polarization imaging unit 22, the white balance adjustment unit 31 adjusts the gain for each color component on the basis of Equations (30) to (32) so that the image signal indicating the white photographic object becomes a signal indicating white. Moreover, the gains Rgain, Ggain, and Bgain are set depending on the light source.

$$SR=Rgain*SR \quad (30)$$

$$SG=Ggain*SG \quad (31)$$

$$SB=Bgain*SB \quad (32)$$

The white balance adjustment unit 31 outputs an image signal of the color polarized image subjected to the white balance adjustment to the demosaicing unit 42.

The demosaicing unit 42 performs the demosaicing, which is similar to the second embodiment, using the image signal of the color polarized image subjected to the white balance adjustment by the white balance adjustment unit 31, and generates the image signal for each polarization for each color component. The demosaicing unit 42 generates a polarized image for each color component for each color component and outputs it to the color non-polarized image acquisition unit 52 and the normal information acquisition unit 63 as illustrated in FIG. 19.

The color non-polarized image acquisition unit 52 generates a non-polarized image from the polarized image of each polarization component that is generated for each color component in the demosaicing unit 42. The color non-polarized image acquisition unit 52 performs processing of averaging pixel signals of different polarization components for each color component for each pixel and generates a non-polarized image for each color component, which is similar to the second embodiment.

The normal information acquisition unit 63 acquires the normal information on the basis of the color polarized image for each polarization component and for each color component that is generated by the demosaicing unit 42. In the demosaicing unit 42, the color polarized image is generated for each polarization component and for each color component. Thus, the normal information acquisition unit 63 performs the arithmetic operation of Equation (33) for each polarization component on the pixel (x,y) of the color polarized image generated by the demosaicing unit 42 and calculates a color difference I' for each polarized component.

[Math. 3]

$$I'n = \sqrt{(R_n - G_n)^2 + (G_n - B_n)^2 + (B_n - R_n)^2} \quad (33)$$

The normal information acquisition unit 62 performs the fitting to the polarization characteristic model formula of Equation (34) in a similar manner to the normal information acquisition unit 62 of the second embodiment by using the color difference I' calculated for each polarization component, and acquires the normal information on the basis of the fitted polarization characteristic model formula.

[Math. 4]

$$I' = \frac{I'_{max} + I'_{min}}{2} + \frac{I'_{max} - I'_{min}}{2} \cos(2\upsilon - 2\phi) \quad (34)$$

Figure 23:
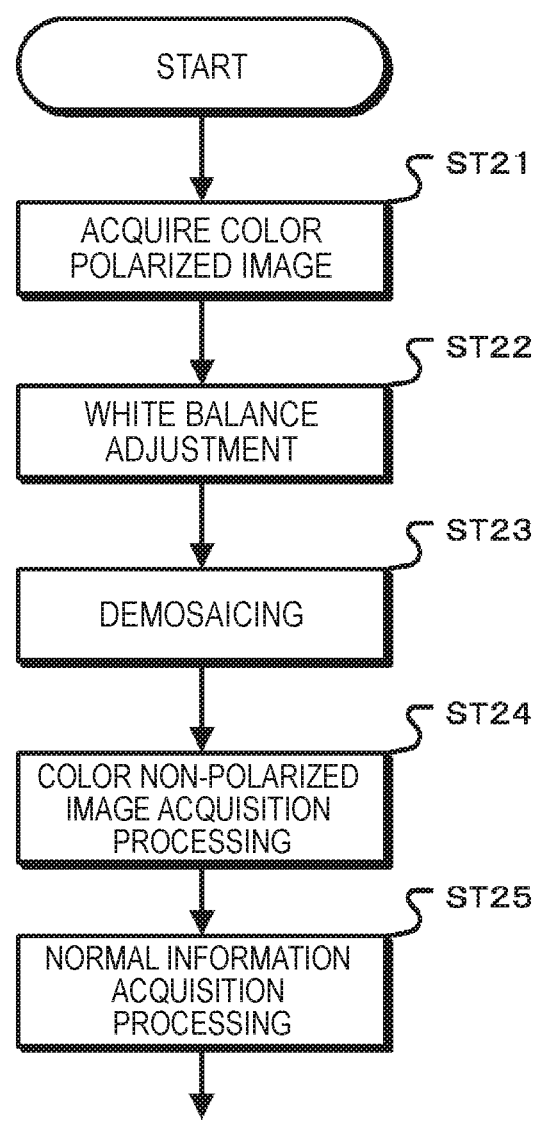
FIG. 23 is a flowchart illustrating the operation of the third embodiment.

FIG. 23 is a flowchart illustrating the operation of the third embodiment. In step ST21, the image processing device 13 acquires a color polarized image. The image processing device 13 acquires a color polarized image including pixel signals of polarization components of three or more directions, and then proceeds to step ST22.

In step ST22, the image processing device 13 performs white balance adjustment. The image processing device 13 adjusts the gain of the pixel signal of each color so that a white photographic object can be displayed as white, and then proceeds to step ST23.

In step ST23, the image processing device 13 performs the demosaicing. The image processing device 13 performs the demosaicing on the color polarized image subjected to the white balance adjustment in step ST22 and generates a polarized image for each polarization component for each color component, then proceeds to step ST 24.

In step ST24, the image processing device 13 performs the color non-polarized image acquisition processing. The image processing device 13 calculates the average signal for each color component of the polarization component for each pixel by using the image of each color for each polarization component that is obtained by the demosaicing in step ST23 and sets the calculated average signal as the pixel signal of the pixel. The image processing device 13 performs such processing to acquire an image for each of non-polarized color component, and then proceeds to step ST25.

In step ST25, the image processing device 13 performs the normal information acquisition processing. The image processing device 13 uses the image for each polarization component for each color component that is obtained by performing the demosaicing in step ST23 and calculates the color difference for each polarization component by using the pixel signals for each color component of the identical polarization component for each pixel. In addition, for each pixel, fitting to the model formula is performed using the color difference of each polarization component, and the azimuth angle or the zenith angle is acquired on the basis of the model formula indicating the relationship between the luminance and the polarization angle, and so the azimuth angle or the zenith angle is set as the normal information. In addition, the azimuth angle and the zenith angle may be imaged and may be set as the normal information.

As described above, in the third embodiment, for each pixel of a color mosaic color polarized image including pixels for each of a plurality of polarization components, a pixel signal for each polarization component is calculated for each color component, and the polarized image of each polarization component can be generated in the demosaicing unit for each color component without causing deterioration in resolution. In addition, a pixel signal for each color component of a plurality of polarization components is generated for each pixel, and so a non-polarized image for each color component can be obtained without deterioration in resolution. Furthermore, in the demosaicing unit, a pixel signal for each of the plurality of polarization components and color components can be calculated for each pixel, and so the normal information can be acquired for each pixel. In addition, the normal information is acquired on the basis of color difference, so even in the case where it is difficult to correctly acquire the normal information from the luminance of the polarized image, it is possible to acquire correctly the normal information. Furthermore, in the demosaicing unit, the demosaicing is performed using the color polarized image subjected to the white balance adjustment, so it is possible to acquire the normal information without the influence of color or the like of illumination light.

<4. Fourth Embodiment>

A fourth embodiment is now described. There may be a case where a pixel, which fails to obtain a pixel signal corresponding to incident light, for example, a defective pixel whose pixel signal is less than a signal level corresponding to incident light or a saturated pixel in which a pixel signal is saturated irrespective of incident light, is generated in an image sensor. In addition, in the image sensor, a pixel for the image plane phase difference AF (hereinafter referred to as "ZAF pixel") is provided, so it may fail to obtain a pixel signal equivalent to a pixel signal obtained by other pixels corresponding to the incident light in some cases.

Thus, in the fourth embodiment, a case is described where signal level correction processing is performed on a correction pixel by setting a pixel that fails to obtain a pixel signal corresponding to incident light, such as a defective pixel, a saturated pixel, or a ZAF pixel, as the correction pixel.

Figure 24:
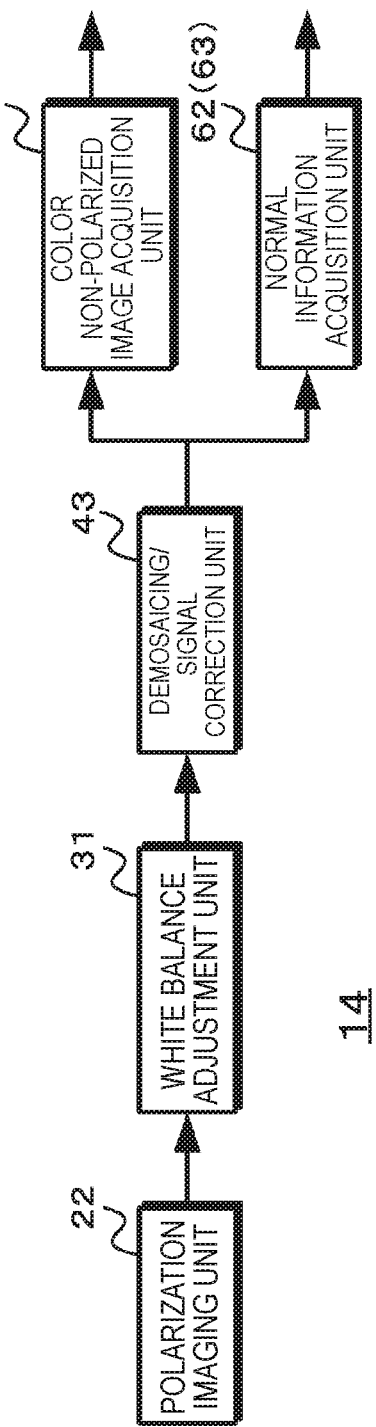
FIG. 24 is a diagram illustrating the configuration of a fourth embodiment.

FIG. 24 illustrates the configuration of the fourth embodiment of the image processing device of the present technology. The image processing device 13 includes a polarization imaging unit 22, a demosaicing/signal correction unit 43, a color non-polarized image acquisition unit 52, and a normal information acquisition unit 62 (63).

The polarization imaging unit 22 is configured in a similar manner to the second embodiment, and generates an image signal of a color polarized image including pixels for each of a plurality of polarization components. The polarization imaging unit 22 outputs the image signal of the generated color polarized image to the white balance adjustment unit 31.

The white balance adjustment unit 31 performs white balance adjustment, in a similar manner to the third embodiment, on the color polarized image generated by the polarization imaging unit 22 and outputs the image signal subjected to the white balance adjustment to the demosaicing/signal correction unit 43.

Figure 25:
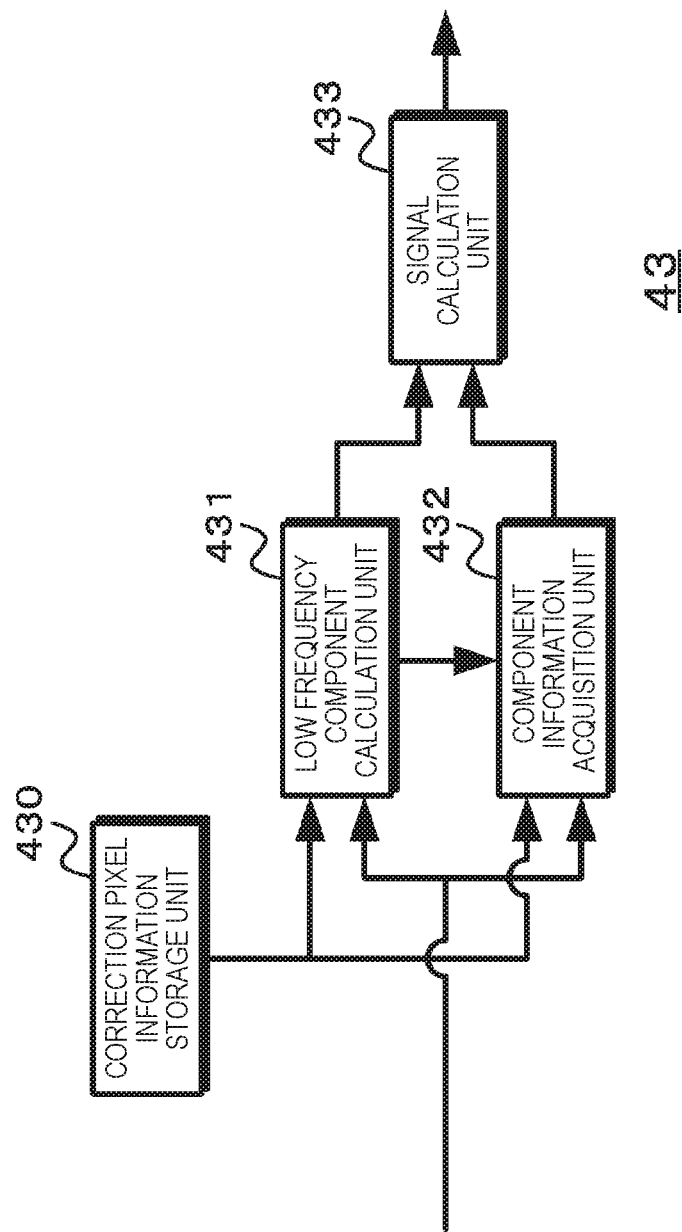
FIG. 25 is a diagram illustrating the configuration of a demosaicing/signal correction unit.

The demosaicing/signal correction unit 43 performs the demosaicing and pixel signal correction processing by using the image signal of the color polarized image from the white balance adjustment unit 31, and generates an image signal for each polarization component for each color component. FIG. 25 illustrates the configuration of the demosaicing/signal correction unit. The demosaicing/signal correction unit 43 includes a correction pixel information storage unit 430, a low frequency component calculation unit 431, a component information acquisition unit 432, and a signal calculation unit 433.

The correction pixel information storage unit 430 stores correction pixel information including position information of a correction pixel that fails to obtain a pixel signal corresponding to a photographic object. In one example, in the correction pixel information storage unit 430, the position information of the ZAF pixel is stored in advance in the manufacturing process of the image sensor. In addition, in one example, the position information of a defective pixel or a saturated pixel detected by capturing a white or black photographic object on the entire screen in the manufacturing process is stored in the correction pixel information storage unit 430. Moreover, the position information of a defective pixel or a saturated pixel is not limited to the case where it is detected and stored in the manufacturing process. In one example, a configuration may be possible in which the user performs calibration of the polarization imaging unit 22 and a white or black photographic object is captured on the entire screen, and so position information of a newly detected defective pixel or saturated pixel can be additionally stored. The correction pixel information storage unit 430 outputs the stored correction pixel information to the low frequency component calculation unit 431 and the component information acquisition unit 432.

Figure 26:
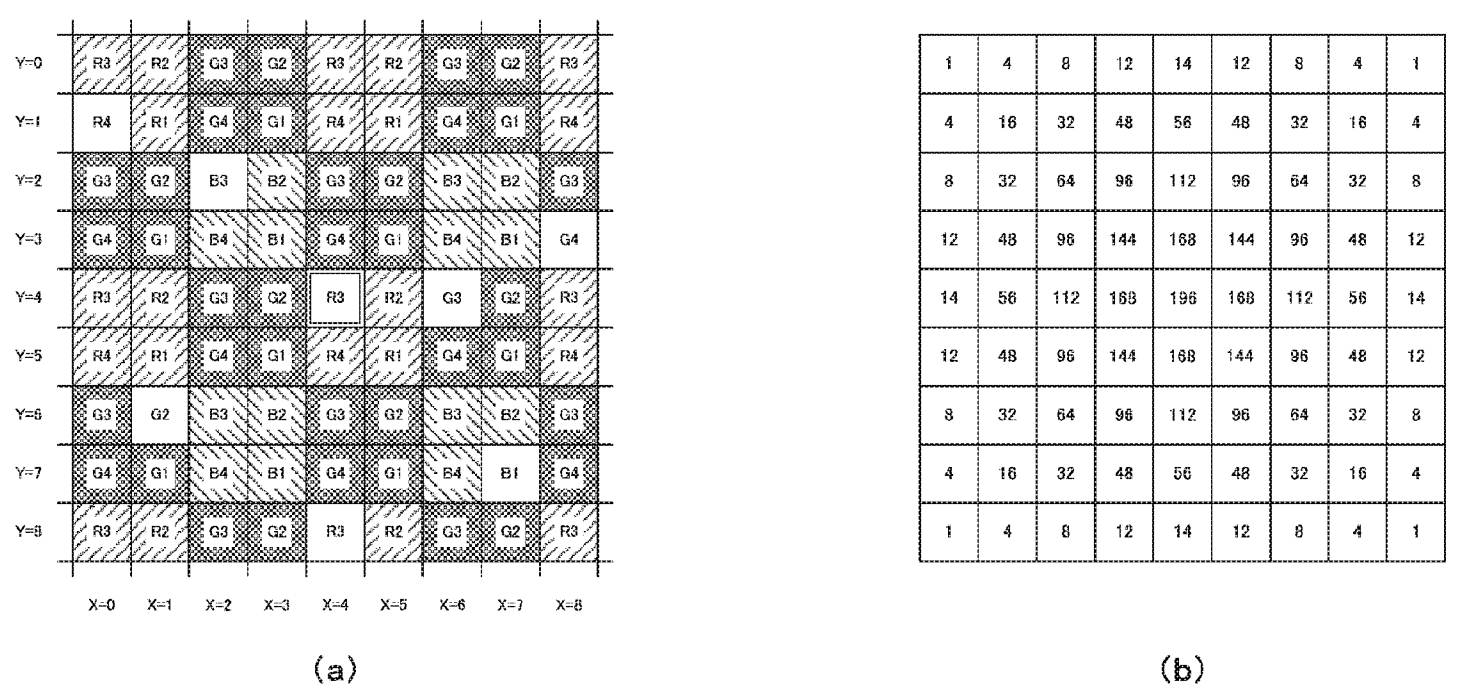

The low frequency component calculation unit 431 uses the pixel signal of pixels located near the target pixel in the color polarized image subjected to the white balance adjustment by the white balance adjustment unit 31 for each color component and for each of the identical polarization components, and calculates a low frequency component for each polarization component for each color component. The low frequency component calculation unit 431 performs the two-dimensional filtering by using the pixel signals of pixels of the identical polarization component located near the target pixel for each polarization component for each color component, and so outputs the low frequency component of each polarization component for each color component. Furthermore, the low frequency component calculation unit 431 performs the low-pass filtering so that the correction pixel indicated by the correction image information is not used. FIG. 26 is a diagram illustrated to describe the low-pass filtering. The low frequency component calculation unit 431 calculates a low frequency component using, in one example, a two-dimensional weighted filter. In FIG. 26, (a) illustrates pixels used by the two-dimensional filter, and in FIG. 26, (b) illustrates filter coefficients. The low frequency component calculation unit 431 calculates, for each color component, a low frequency component for each polarization component in the target pixel indicated by a double-line frame using, in one example, a 9×9 tap two-dimensional filter. Moreover, in FIG. 26, (a) illustrates the case where the target pixel is a pixel of the R3 polarization component. In addition, in (a) of FIG. 26, pixels with no diagonal lines (0,1), (1,6), (2,2), (4,4), (4,8), (6,4), (7,7), and (8,3) are correction pixels indicated by the correction pixel information from the correction pixel information storage unit 430.

In the case where the low frequency component calculation unit 431 calculates, for each color component, a low frequency component for each polarization component, the low frequency component calculation unit 431 calculate a low frequency component for each polarization component in the target pixel for each color component by using the pixel signal of pixels of the identical polarization component and color component and using a filter coefficient corresponding to a pixel within 9×9 taps. Specifically, for each polarization component, the signal of the pixel of the identical color component and polarization component is multiplied by the filter coefficient corresponding to the pixel, and the weighted sum of the multiplication result is divided by the total sum of the weights to calculate the low frequency component.

As illustrated in (a) of FIG. 26, in a case where the target pixel (x=4, y=4) is the R3 polarization component and the target pixel is the correction pixel, the low frequency component calculation unit 431 performs the filtering without using the correction pixel. Specifically, the low frequency component R3LPF of the R3 polarization component is calculated using Equation (35). In addition, the low frequency component calculation unit 431 calculates not only the low frequency component SR3LPF of the R3 polarization component in the target pixel but also the low frequency component SR1LPF of the R1 polarization component in the target pixel using Equation (36). Furthermore, the low frequency component calculation unit 431 calculates the low frequency component SR2LPF of the R2 polarization component in the target pixel using Equation (37) and calculates the low frequency component SR4LPF of the R4 polarization component in the target pixel using Equation (38).

$$SR3LPF = \\ (1*SR3(0,0) + 14*SR3(4,0) + 1*SR3(8,0) + 14*SR3(0,4) + \\ 14*SR3(8,4) + 1*SR3(0,8) + 1*SR3(8,8))/46 \quad (35)$$

$$SR1LPF = (16*SR1(1,1) + 48*SR1(5,1) + \\ 48*SR1(1,5) + 144*SR1(5,5))/256 \quad (36)$$

$$SR2LPF = (4*SR2(1,0) + 12*SR2(5,0) + 56*SR2(1,4) + \\ 168*SR2(5,4) + 4*SR2(1,8) + 12*SR2(5,8))/256 \quad (37)$$

$$SR4LPF = (56*SR4(4,1) + 4*SR4(8,1) + \\ 12*SR4(0,5) + 168*SR4(4,5) + 12*SR4(8,5))/252 \quad (38)$$

Furthermore, the low frequency component calculation unit 431 performs the filtering on not only the red component of the target pixel but also the green component and the blue component without using the correction pixel, and calculates the low frequency component for each polarization component. In one example, the low frequency component SG3LPF of the G3 polarization component in the target pixel is calculated using Equation (39), and the low frequency component SB3LPF of the B3 polarization component in the target pixel is calculated using Equation (40). In addition, low frequency components are similarly calculated for other polarization components.

$$SG3LPF = \\ (8*SG3(2,0)+8*SG3(6,0)+8*SG3(0,2)+112*SG3(4,2)+ \\ 8*SG3(8,2)+112*SG3(2,4)+8*SG3(0,6)+112*SG3 \\ (4,6)+8*SG3(8,6)+8*SG3(2,8)+8*SG3(6,8))/400$$ (39)

$$SB3LPF = (64*SB3(6,2)+64*SB3(2,6)+64*SB3(6,6))/192$$ (40)

The low frequency component calculation unit 431 performs the processing described above by using each pixel in the polarized image generated by the polarization imaging unit 22 as a target pixel and calculates low frequency components SR1LPF to SR4LPF, SG1LPF to SG4LPF, and SB1LPF to SB4LPF for each pixel. The low frequency component calculation unit 431 outputs the calculated low frequency component to the component information acquisition unit 432 and the signal calculation unit 433.

The component information acquisition unit 432 acquires component information indicating a relationship between the low frequency component of the polarization component of the polarized image that is calculated by the low frequency component calculation unit 431 for the target pixel in the polarized image and the pixel signal of the target pixel, in a similar manner to the component information acquisition unit 412 in the first embodiment. The component information acquisition unit 432 sets, as the component information, in one example, a high frequency added gain obtained by setting a value obtained by adding a high-frequency component to the low frequency component of the target pixel as a pixel signal of a target pixel. In a case where the target pixel is, in one example, a pixel at the coordinates (4,4) illustrated in (a) of FIG. 26, that is, the correction pixel, the component information acquisition unit 432 uses the property peculiar to the polarization component that can be approximated as the polarization characteristic model formula, and so calculates the R3 polarization component at the coordinates (4,4).

Figure 27:
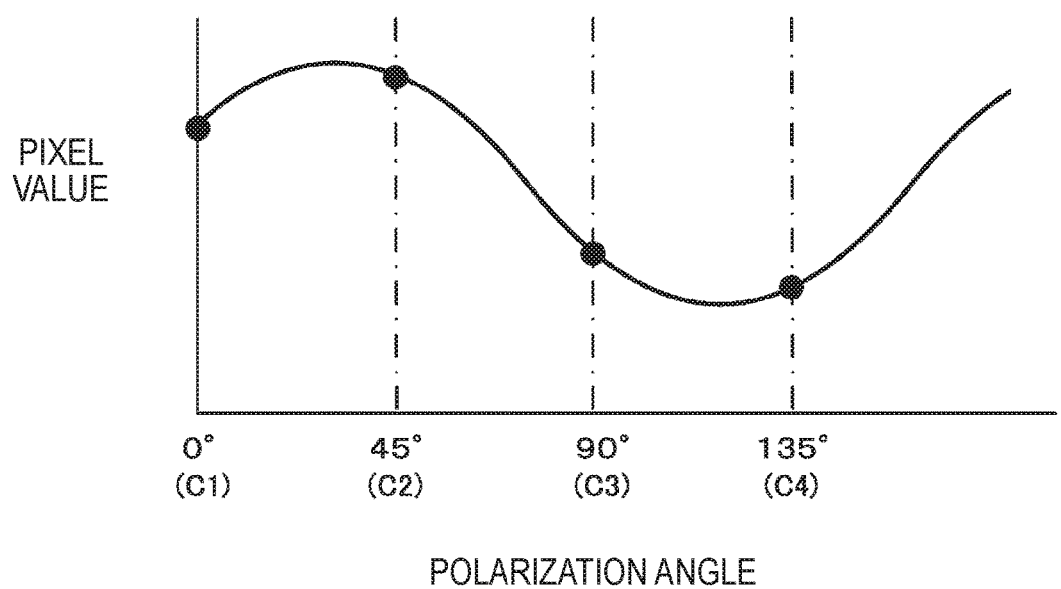
FIG. 27 is a diagram illustrating a relationship between a fitting curve and a pixel signal of each polarization component.

Here, in a case where the polarization direction is, in one example, 0°, 45°, 90°, and 135°, the curve of the polarization characteristic model and the pixel signal of each polarization component have the relationship illustrated in FIG. 27 and satisfy the relationship of Equation (41).

$$SR1+SR3=SR2+SR4$$ (41)

Thus, the component information acquisition unit 432 calculates the pixel signal SR3 of the R3 polarization component at the coordinates (4,4) on the basis of Equation (42), and calculates the high frequency added gain SDhpg on the basis of Equation (43) using the calculation result.

$$SR3(4,4)=SR2(5,4)+SR4(4,5)-SR1(5,5)$$ (42)

$$SDhpg=SR3(4,4)/SR3LPF$$ (43)

In this manner, in the case where the target pixel is the correction pixel, the component information acquisition unit 432 calculates the pixel signal of the polarization component using the property of the polarization component, and calculates the high frequency added gain using the calculated pixel signal calculate. In addition, in a case where the target pixel is not the correction pixel, the component information acquisition unit 432 calculates the high frequency added gain SDhpg in a similar manner to the component information acquisition unit 422 of the second and third embodiments.

The component information acquisition unit 432 calculates the high frequency added gain SDhpg by using each pixel in the color polarized image generated by the polarization imaging unit 22 as a target pixel irrespective of whether the target pixel is the correction pixel, and outputs the calculated high frequency added gain SDhpg to the signal calculation unit 433.

The signal calculation unit 433 calculates a pixel signal for each polarization component in the target pixel for each color component on the basis of the low frequency component for each polarization component and for each color component that is calculated by the low frequency component calculation unit 431 and the component information acquired by the component information acquisition unit 432.

The signal calculation unit 433 applies the relationship between the low frequency component of the polarization component of the polarized image in the target pixel and the pixel signal to the relationship between the low frequency component of the other polarization component in the target pixel and the pixel signal of the other polarization component, and so calculates a pixel signal for each polarization component in the target pixel. Furthermore, the signal calculation unit 423 calculates the pixel signal for each polarization component in the target pixel for each color component, using the relationship between the low frequency component of the polarization component of the polarized image in the target pixel and the pixel signal.

Further, the signal calculation unit 433 performs similar processing by using each pixel in the color polarized image generated by the polarization imaging unit 22 as a target pixel, generates a polarized image for each polarization component for each color component as illustrated in FIG. 19, and outputs it to the non-polarized image acquisition unit 52 and the normal information acquisition unit 62 (63).

The color non-polarized image acquisition unit 52 generates a non-polarized image from the polarized image for each polarization component that is generated for each color component in the demosaicing/signal correction unit 43. The color non-polarized image acquisition unit 52 calculates a pixel signal for each color component by averaging the pixel signals of four different polarization components for each color component in a similar manner to the second embodiment, thereby acquiring a non-polarized image for each color component.

The normal information acquisition unit 62 (63) acquires the normal information on the basis of the polarized image for each polarization component that is generated by the demosaicing/signal correction unit 43. The normal information acquisition unit 62 (63) calculates the luminance on the basis of, in one example, Equation (29) (or calculate color difference on the basis of Equation (33)), performs processing similar to that of the second (third) embodiment using the calculated luminance, and acquires the normal information.

Figure 28:
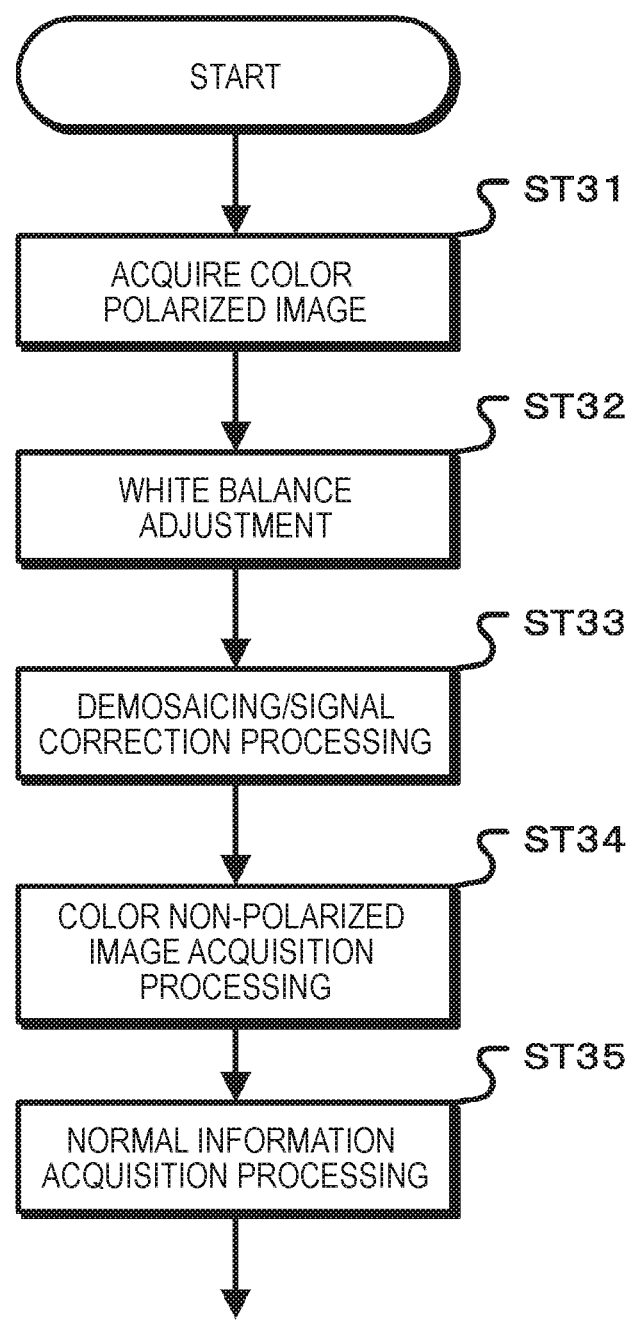
FIG. 28 is a flowchart illustrating the operation of the fourth embodiment.

FIG. 28 is a flowchart illustrating the operation of the fourth embodiment. In step ST31, the image processing device 14 acquires a color polarized image. The image processing device 14 acquires a color polarized image including pixel signals of polarization components of three or more directions, and then proceeds to step ST32.

In step ST32, the image processing device 14 performs white balance adjustment. The image processing device 14 adjusts the gain of the pixel signal of each color so that a white photographic object can be displayed as white, and then proceeds to step ST33.

In step ST33, the image processing device 14 performs demosaicing/pixel correction processing. The image processing device 14 performs the demosaicing and signal correction processing on the color polarized image subjected to white balance adjustment in step ST32 and generates a polarized image of a plurality of polarization components for each color component.

Figure 29:
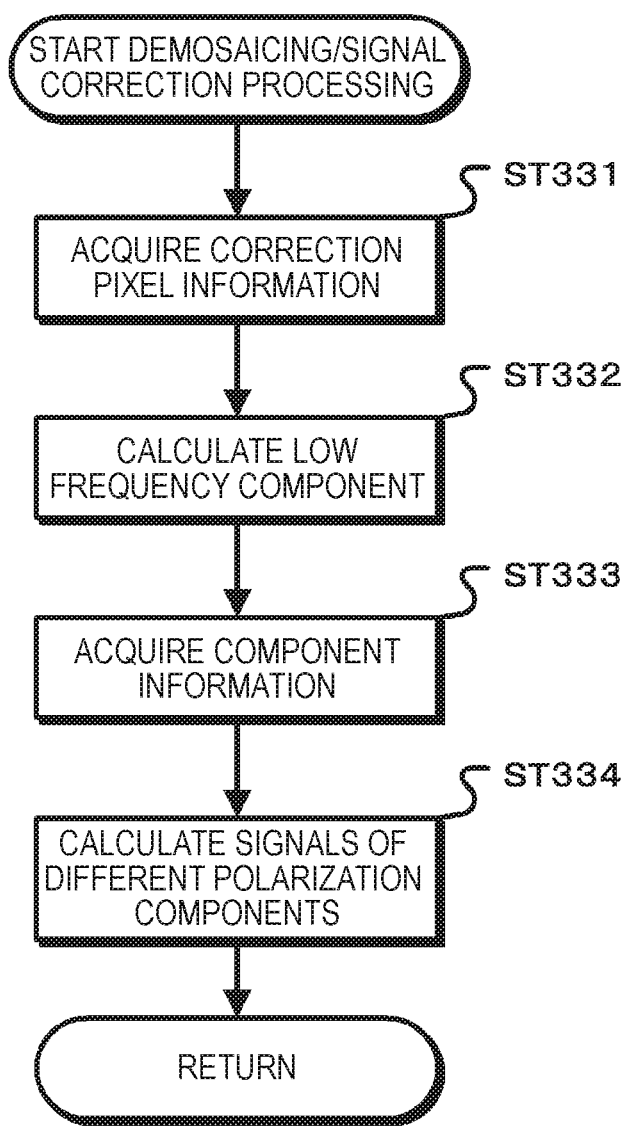
FIG. 29 is a flowchart illustrating demosaicing/signal correction processing.

FIG. 29 is a flowchart illustrating the demosaicing/signal correction processing. In step ST331, the image processing device 14 acquires the correction pixel information. The image processing device 14 acquires the correction pixel information including the position of a pixel necessary for correction of the signal, such as a defective pixel, and then proceeds to step ST332.

In step ST332, the image processing device 14 calculates a low frequency component. The image processing device 14 performs, in one example, the two-dimensional filtering using pixel signals of identical polarization components, and calculates the low frequency component for each polarization component in the target pixel. In addition, the image processing device 14 performs the two-dimensional filtering without using the correction pixel indicated by the correction pixel information, and then proceeds to step ST333.

In step ST333, the image processing device 14 acquires component information. The image processing device 14 acquires the component information indicating the relationship between the low frequency component of the polarization component of the polarized image of the target pixel and the pixel signal of the target pixel. In addition, in the case where the correction pixel information indicates that the target pixel is a pixel that fails to obtain a pixel signal corresponding to the incident light, the image processing device 14 calculates a pixel signal of the target pixel using the property peculiar to the polarization component. The image processing device 14 calculates the pixel signal of the target pixel from the relationship between the phase and the pixel signal in the polarization characteristic model formula using a pixel signal of a neighboring pixel that has a different polarization component but is equivalent to a color component of the target pixel, and then proceeds to step ST334.

In step ST334, the image processing device 14 calculates signals of different polarization components. The image processing device 14 generates a pixel signal for each polarization component in the target pixel on the basis of the component information acquired in step ST333 and the low frequency component for each polarization component that is calculated in step ST332. In addition, the image processing device 14 performs the processing in steps ST332 to ST334 for each pixel of the polarized image acquired in step ST31 and generates, for each polarization component, a polarized image indicating the polarization component for each pixel, and then proceeds to step ST34 of FIG. 27.

In step ST34, the image processing device 14 performs the color non-polarized image acquisition processing. The image processing device 13 uses the image of each color component for each polarization component that is obtained by performing the demosaicing/signal correction processing in step ST33, and so calculates the average signal of the polarization component for each color component for each pixel and sets it as the pixel signal of the pixel. The image processing device 14 performs such processing to acquire an image for each color component of non-polarized light, and then proceeds to step ST35.

In step ST35, the image processing device 14 performs normal information acquisition processing. The image processing device 14 uses the image for each polarization component of each color component that is obtained by performing the demosaicing/signal correction processing in step ST33 and calculates the luminance or color difference using the pixel signal for each color component of the identical polarization components for each pixel. In addition, for each pixel, fitting to the polarization characteristic model formula is performed using the luminance or color difference of each polarization component, and the azimuth angle or the zenith angle is acquired on the basis of the fitted polarization characteristic model formula to set it as the normal information. In addition, the azimuth angle and the zenith angle may be imaged and may be set as the normal information.

As described above, in the fourth embodiment, for each pixel of a color mosaic color polarized image including pixels for each of a plurality of polarization components, a pixel signal for each polarization component is calculated for each color component, and the polarized image of each polarization component can be generated in the demosaicing/signal correction unit for each color component without causing deterioration in resolution. In addition, a pixel signal for each color component of a plurality of polarization components is generated for each pixel, and so a non-polarized image for each color component can be obtained without deterioration in resolution. Furthermore, in the demosaicing unit, a pixel signal for each of the plurality of polarization components and color components can be calculated for each pixel, and so the normal information can be acquired for each pixel. Furthermore, in the case where a defective pixel or a saturated pixel occurs and a pixel signal corresponding to the incident light fails to be obtained, a pixel signal corresponding to the incident light at the position of the defective pixel or the saturated pixel is calculated. In addition, in the case where a ZAF pixel for focus adjustment is provided and an image signal equivalent to a pixel signal obtained by another pixel fails to be obtained depending on the incident light in the ZAF pixel, a pixel signal corresponding to the incident light at the position of the ZAF pixel is calculated. Thus, the use of the polarized image for each color component of the plurality of polarization components that is generated by the demosaicing/signal correction unit makes it possible to acquire the normal information with the reduced influence of the defective pixel or saturated pixel and the ZAF pixel. In addition, the use of the polarized image for each color component of the plurality of polarization components that is generated by the demosaicing/signal correction unit makes it possible to obtain a non-polarized image for each color component from which the influence of a defective pixel or the like is removed.

<5. Other Embodiments>

Figure 30:
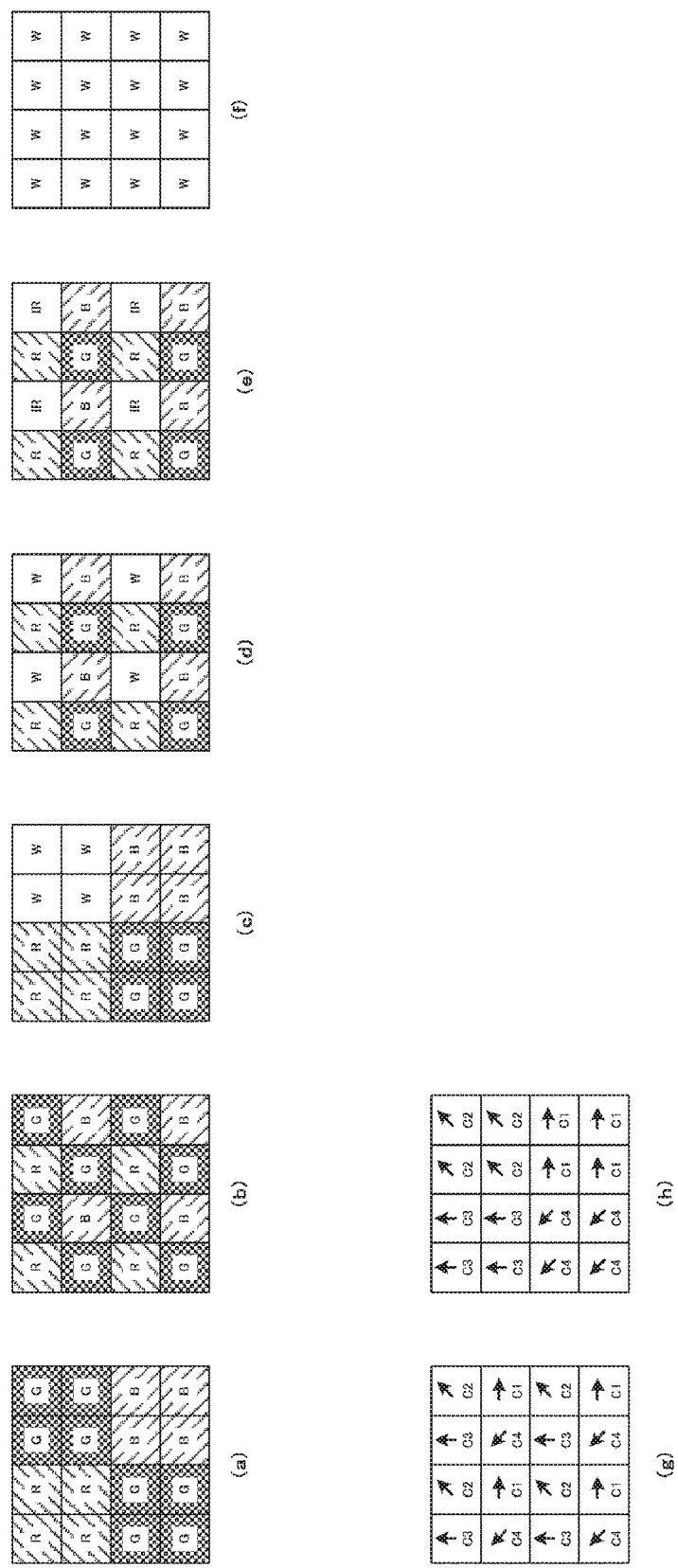
FIG. 30 is a diagram illustrating patterns of a color mosaic filter and a polarization filter.

In the embodiments described above, the description is given of the case of using the color mosaic filter in which 2×2 pixels are arranged repeatedly as one color component unit and the polarization filter in which a color component unit of 2×2 pixels include pixels in four different polarization directions. However, the color mosaic filter or the polarization filter may have other arrangements. FIG. 30 illustrates a color mosaic filter and a polarization filter that can be used in the image processing device of the present technology. Moreover, (a) to (f) of FIG. 30 illustrate color patterns, and (g) and (h) of FIG. 30 illustrate polarization patterns.

The color pattern is not limited to the arrangement in which 2×2 pixels illustrated in (a) of FIG. 30 are provided repeatedly as one color component unit, and may be the Bayer array illustrated in (b) of FIG. 30. In addition, as illustrated in (c) of FIG. 30, a configuration in which white pixels are embedded in an arrangement in which 2×2 pixels are provided repeatedly as one color component unit may be used. As illustrated in (d) of FIG. 30, it may have a configuration in which white pixels are embedded in the Bayer array. Furthermore, as illustrated in (e) of FIG. 30, in one example, an infrared (IR) pixel may be embedded in the Bayer array to enable highly sensitive image capturing even at night or the like. In addition, if all pixels are white pixels as illustrated in (f) of FIG. 30, processing similar to that of the first embodiment can be performed. Moreover, in the Bayer array, the arrangement of pixels of each color component is uniform as compared with the arrangement in which 2×2 pixels are provided repeatedly as one color component unit, so the two-dimensional filter may be made smaller than this arrangement.

As illustrated in (g) of FIG. 30, the polarization pattern may include the pixel unit of 2×2 pixels in four different polarization directions, or as illustrated in (h) of FIG. 30, the pixel unit of 2×2 pixels is set as a polarization unit and 2×2 polarization unit may be configured with four different polarization directions.

The color pattern and the polarization pattern are used in combination with each other to obtain four polarization components for each color component. In one example, in a case where the color mosaic filter is (a) and (c) of FIG. 30, the polarization pattern illustrated in (g) of FIG. 30 is used. In addition, in a case where the color mosaic filter is (b), (d), and (e) of FIG. 30, the polarization pattern illustrated in (h) of FIG. 30 is used. Furthermore, in the case where the color mosaic filter is (a) and (c) of FIG. 30, the polarization pattern illustrated in (h) of FIG. 30 may be used by shifting the phase by one pixel in the horizontal direction and the vertical direction.

Further, the white balance adjustment unit is provided not only in the configuration of the third and fourth embodiments but also in the configuration of the second embodiment so that the demosaicing may be performed using the image signal of the color polarized image subjected to the white balance adjustment.

Further, the processing in the flowcharts illustrated in the first to fourth embodiments described above is not limited to the order processing that performs processing in the order of steps, and the image acquisition processing and the normal information acquisition processing may be performed in parallel. In addition, the pipeline processing allows the polarized image to be acquired sequentially, for example, in units of frames, and accordingly, the non-polarized image and the normal information can be acquired. Furthermore, the first to fourth embodiments described above illustrate the configuration in which the image processing device includes the polarization imaging unit, but the polarization imaging unit may be provided separately from the image processing device.

6. Application Example

Figure 31:
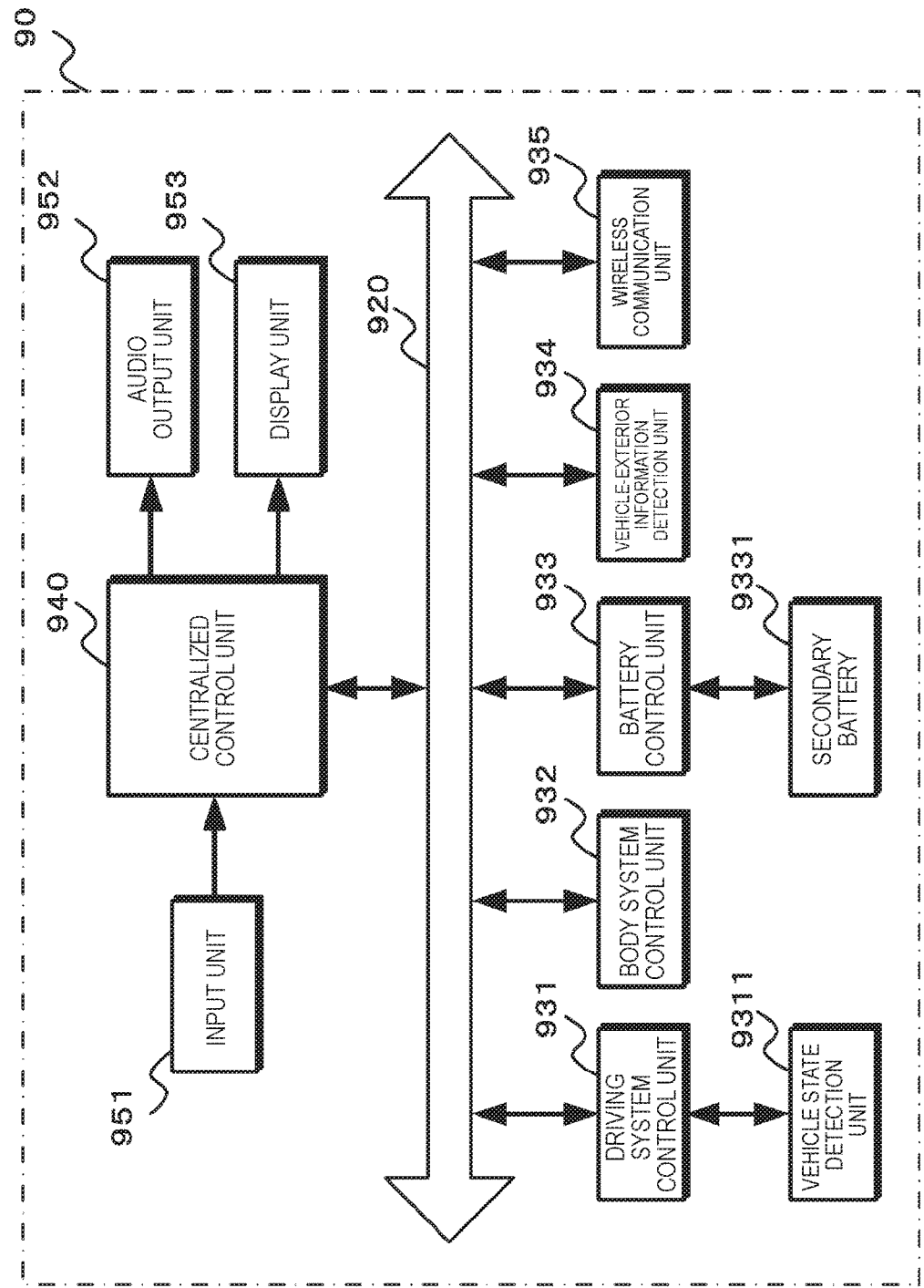
FIG. 31 is a block diagram illustrating the schematic configuration of a vehicle control system.

An application example of the image processing device (image processing method) is now described. FIG. 31 is a block diagram illustrating a schematic configuration of a vehicle control system using the image processing device of the present technology. A vehicle control system 90 includes a plurality of control units or detection units connected to each other via a communication network 920. In the example illustrated in FIG. 31, the vehicle control system 90 includes a driving system control unit 931, a body system control unit 932, a battery control unit 933, a vehicle-exterior information detection unit 934, a wireless communication unit 935, and a centralized control unit 940. The communication network 920 may be, in one example, an in-vehicle communication network that is compliant to any standard such as control unit area network (CAN), local interconnect network (LIN), local area network (LAN), FlexRay (registered trademark), or the like. In addition, the centralized control unit 940 is connected to an input unit 951, an audio output unit 952, and a display unit 953.

Each control unit includes a microcomputer that performs arithmetic operation processing in accordance with various programs, a storage unit that stores programs executed by the microcomputer, parameters used for various arithmetic operations, or the like, and a driving circuit that drives various target devices to be controlled.

The driving system control unit 931 controls the operation of the apparatus relating to the driving system of a vehicle in accordance the various programs. In one example, the driving system control unit 931 functions as a driving force generation device for generating a driving force of a vehicle such as an internal combustion engine or a driving motor, a driving force transmission mechanism for transmitting a driving force to the wheels, and a steering mechanism for adjusting the steering angle of the vehicle. In addition, the driving system control unit 931 may have a function as a control device such as a braking device for generating a braking force of the vehicle and a function as a control device such as anti-lock brake system (ABS), electronic stability control (ESC), or the like.

The driving system control unit 931 is connected to a vehicle state detection unit 9311. The vehicle state detection unit 9311 includes, in one example, at least one of a gyro sensor for detecting angular velocity of shaft rotational motion of the vehicle body, an accelerometer for detecting acceleration of the vehicle, and a sensor for detecting operation amount of the accelerator pedal, operation amount of the brake pedal, steering angle of the steering wheel, engine RPM, driving speed, or the like. The driving system control unit 931 performs the arithmetic operation processing using the signal input from the vehicle state detection unit 9311, and controls the internal combustion engine, driving motor, electric power steering device, brake device, or the like.

The body system control unit 932 controls the operation of various devices equipped on the vehicle body in accordance with various programs. In one example, the body system control unit 932 functions as a keyless entry system, a smart key system, a power window device, or a control device for various lamps such as headlamp, tail lamp, brake lamp, turn signal lamp, fog lamp, or the like. In this case, the body system control unit 932 can receive radio waves transmitted from a portable device that substitutes for a key or a signal of various switches. The body system control unit 932 receives the input of such a radio wave or signal and controls the door lock device, the power window device, the lamp, or the like of the vehicle.

The battery control unit 933 controls a secondary battery 9331 that is a power supply source of the driving motor in accordance with various programs. In one example, information such as battery temperature, battery output voltage, and remaining capacity of the battery is input from the battery device including the secondary battery 9331 to the battery control unit 933. The battery control unit 933 performs arithmetic operation processing using these signals and performs temperature adjustment control of the secondary battery 9331 or control of a cooling device or the like provided in the battery device.

The vehicle-exterior information detection unit 934 detects information outside the vehicle equipped with the vehicle control system 90. The vehicle-exterior information detection unit 934 uses the image processing device 11 (12, 13, or 14) of the present technology.

Figure 32:
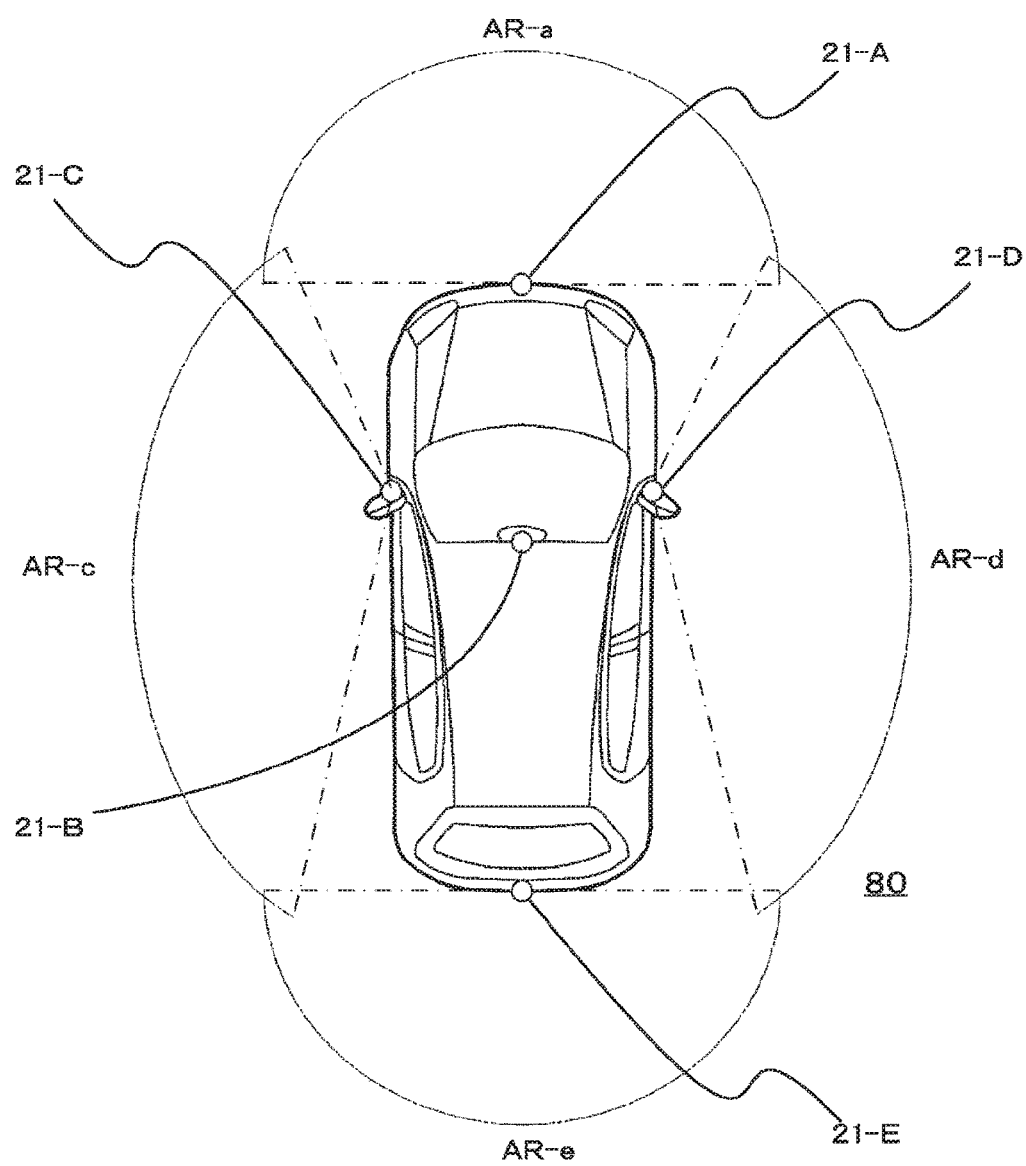
FIG. 32 is a diagram illustrating an installation example of a polarization imaging unit.

FIG. 32 is a diagram illustrating an installation example of the polarization imaging unit. The polarization imaging unit 21 (22) of the image processing device 11 (12, 13, or 14) is provided at the position of, in one example, at least one of the front nose, side mirror, rear bumper, and back door of a vehicle 80, and the upper portion of the windshield in the vehicle passenger compartment. A polarization imaging unit 21-A provided at the front nose and a polarization imaging unit 21-B provided on the upper portion of the windshield in the vehicle passenger compartment mainly acquire an image ahead of the vehicle 80. Polarization imaging units 21-C and 21-D provided in the side mirror mainly acquire an image of the side of the vehicle 80. Polarization imaging unit 21-E provided in the rear bumper or the back door mainly acquires an image behind the vehicle 80. In addition, FIG. 32 illustrates an example of the shooting range of each of the polarization imaging units 21-A to 21-E. An image capturing range AR-a indicates the image capturing range of the polarization imaging unit 21-A provided in the front nose. Image capturing ranges AR-c and AR-d indicate the image capturing range of the polarization imaging units 21-C and 21-D provided on the side mirrors, respectively. An image capturing range AR-e indicates the image capturing range of the polarization imaging unit 21-E provided in the rear bumper or back door.

Referring back to FIG. 31, the vehicle-exterior information detection unit 934 captures an image of a peripheral region of the vehicle and acquires a polarized image. In addition, the vehicle-exterior information detection unit 934 acquires polarization characteristics of a photographic object from the acquired polarized image. Furthermore, the vehicle-exterior information detection unit 934 generates information usable for vehicle control or the like using the acquired polarization characteristics.

The wireless communication unit 935 communicates with a management center that manages external situation of the vehicle, for example, other vehicles or road conditions via a wireless communication network such as dedicated short range communication (DSRC, registered trademark), and outputs the received information to the centralized control unit 940. In addition, the wireless communication unit 935 transmits the polarization characteristics or the like acquired by the vehicle-exterior information detection unit 934 to other vehicles, the management center, or the like. Moreover, the wireless communication unit 935 may communicate with the management center via a wireless communication network such as a wireless LAN wireless communication network, a wireless communication network for mobile phones such as 3G, LTE, and 4G. or the like. In addition, the wireless communication unit 935 may receive a signal or the like of the global navigation satellite system (GNSS), perform positioning, and output the positioning result to the centralized control unit 940.

The centralized control unit 940 is connected to the input unit 951, the audio output unit 952, and the display unit 953. The input unit 951 is provided as, in one example, a device operable by a vehicle driver, such as a touch panel, a button, a microphone, a switch, or a lever. The input unit 951 generates an input signal on the basis of information input by a vehicle driver or the like, and outputs it to the centralized control unit 940.

The audio output unit 952 audibly notifies the vehicle driver of the information by outputting sound on the basis of an audio signal from the centralized control unit 940. The display unit 953 displays an image on the basis of an image signal from the centralized control unit 940 and visually notifies the vehicle driver of the information.

The centralized control unit 940 includes a central processing unit (CPU), a read only memory (ROM), a random access memory (RAM), or the like. The read only memory (ROM) stores various programs to be executed by a central processing unit (CPU). The random access memory (RAM) stores information such as various parameters, arithmetic operation result, or sensor signal. The CPU executes various programs stored in the ROM and controls the overall operation in the vehicle control system 90 depending on an input signal from the input unit 951, information obtained by communication with each control unit, the vehicle-exterior information detection unit, and the wireless communication unit via the communication network 920, and information stored in the RAM, or the like. In addition, the centralized control unit 940 generates an audio signal indicating information to be audibly notified to the vehicle driver and outputs it to the audio output unit 952, and the centralized control unit 940 generates an image signal visually notifying the information and outputs it to the display unit 953. In addition, the centralized control unit 940 communicates with various devices existing outside the vehicle, such as other vehicles or the management center, using the wireless communication unit 935. In addition, the centralized control unit 940 supports the vehicle driving on the basis of map information stored in ROM or RAM and the positioning result acquired from the wireless communication unit 935.

Moreover, in the example illustrated in FIG. 31, at least two control units connected via the communication network 920 may be integrated as one control unit. Alternatively, each control unit may include a plurality of control units. Furthermore, the vehicle control system 90 may include another control unit that is not illustrated. In addition, in the above description, some or all of the functions carried out by any control unit may be provided to other control units. In other words, as long as information is transmitted and received via the communication network 920, the predetermined arithmetic operation processing may be performed by any control unit.

In such a vehicle control system, in a case where the image processing device of the present technology is applied to, in one example, the vehicle-exterior information detection unit, so it is possible for the vehicle-exterior information detection unit to acquire high resolution normal information or non-polarized image. Thus, it is possible to accurately detect an obstacle or the like by using the normal information or the non-polarized image acquired by the vehicle-exterior information detection unit, thereby constructing a vehicle control system enabling safer driving.

Further, the image processing device described above may be an image capturing device, an electronic apparatus having an image capturing function, or the like. Further, a series of processing described herein can be executed by hardware, software, or the combination thereof. In a case of executing the processing by the software, the processing can be executed by installing the program in which the processing sequence is recorded in the memory of the computer embedded in the dedicated hardware, or can be executed by installing the program in the general-purpose computer that can execute various processing.

In one example, the program can be recorded previously on a hard disk, a solid-state drive (SSD), or a read only memory (ROM), as a recording medium. Alternatively, the program can be temporarily or permanently stored (recorded) in (on) a removable recording medium such as a flexible disk, a compact disc read only memory (CD-ROM), Magneto Optical (MO) disk, a digital versatile disc (DVD), a Blu-Ray Disc (registered trademark) (BD), a magnetic disk, or a semiconductor memory card. Such a removable recording medium can be provided as so-called package software.

In addition, the program can be, not only installed on a computer from a removable recording medium, but also transferred wirelessly or by wire to the computer from a download site via a network such as a local area network (LAN) or the Internet. In such a computer, a program transferred in the aforementioned manner can be received and installed on a recording medium such as built-in hardware.

Note that the effects described in the present specification are merely examples, not limitative; and additional effects that are not described may be exhibited. Furthermore, the present technology is not construed as being limited to the above-described embodiments of the technology. The embodiments of the technology disclose the present technology in the form of exemplification, and it is obvious that a person skilled in the art can make modification or substitution of the embodiments without departing from the gist of the present technology. In other words, in order to determine the gist of the present technology, the claims should be considered.

Additionally, the present technology may also be configured as below.

(1)

An image processing device including:

a demosaicing unit configured to use a pixel signal of a target pixel of a polarized image including pixels for each of a plurality of polarization components and a pixel signal of a pixel for each of identical polarization components located near the target pixel to calculate a pixel signal for each polarization component different from the polarization component of the polarized image in the target pixel.

(2)

The image processing device according to (1), in which the demosaicing unit calculates the pixel signal for each polarization component in the target pixel on a basis of a low frequency component for each polarization component and component information indicating a relationship between the low frequency component of the polarization component of the polarized image and the pixel signal of the target pixel, the low frequency component for each polarization component being calculated by using the pixel signal of the pixel located near the target pixel for each of the identical polarization components.

(3)

The image processing device according to (2), further including:

a low frequency component calculation unit configured to calculate the low frequency component by performing two-dimensional filtering using the pixel signal of the pixel of the identical polarization component located near the target pixel.

(4)

The image processing device according to any one of (1) to (3), in which the demosaicing unit generates, by using each pixel of the polarized image as the target pixel, a polarized image for each polarization component.

(5)

The image processing device according to any one of (1) to (4), further including:

a normal information acquisition unit configured to acquire normal information by using the pixel signal for each of the plurality of polarization components that is calculated by the demosaicing unit.

(6)

The image processing device according to (5), in which the normal information acquisition unit performs fitting to a polarization characteristic model by using the pixel signal for each of the plurality of polarization components to acquire the normal information from the fitted polarization characteristic model.

(7)

The image processing device according to any one of (1) to (4), in which the polarized image including the pixels for each of the plurality of polarization components is a color polarized image, and the demosaicing unit uses the pixel signal of the pixel for each of the identical polarization components located near the target pixel for each color component to calculate the pixel signal for each polarization component in the target pixel for each color component.

(8)

The image processing device according to (7), further including:

a normal information acquisition unit configured to acquire normal information by using the pixel signal of the target pixel calculated by the demosaicing unit.

(9)

The image processing device according to (8), in which the normal information acquisition unit calculates luminance for each polarization component by using the pixel signal for each color component that is calculated by the demosaicing unit for each polarization component to acquire the normal information on a basis of the calculated luminance for each polarization component.

(10)

The image processing device according to (8), further including:

a white balance adjustment unit configured to adjust white balance of the color polarized image, in which the demosaicing unit uses the color polarized image subjected to the white balance adjustment to calculate the pixel signal for each of the plurality of polarization components for each color component, and the normal information acquisition unit calculates color difference for each polarization component by using the pixel signal for each color component that is calculated by the demosaicing unit for each polarization component to acquire the normal information on a basis of the calculated color difference for each polarization component.

(11)

The image processing device according to any one of (1) to (6), further including:

a non-polarized image acquisition unit configured to generate a pixel signal of a non-polarized image from the pixel signal for each of the plurality of polarization components.

(12)

The image processing device according to (11), in which the non-polarized image acquisition unit calculates the pixel signal of the non-polarized image by averaging the pixel signals for each of the plurality of polarization components.

(13)

The image processing device according to any one of (7) to (12), in which the polarized image including the pixels for each of the plurality of polarization components is a color polarized image, the demosaicing unit uses the pixel signal of the pixel for each of the identical polarization components located near the target pixel for each color component to calculate the pixel signal for each polarization component in the target pixel for each color component, and the non-polarized image acquisition unit calculates the pixel signal of the non-polarized image for each color component by using the pixel signal for each polarization component that is calculated by the demosaicing unit for each color component.

(14)

The image processing device according to any one of (1) to (13), further including:

a correction pixel information storage unit configured to store correction pixel information, in which the demosaicing unit calculates a pixel signal of a correction pixel indicated by the correction pixel information by using a pixel signal of a peripheral pixel having a different polarization component on a basis of a polarization characteristic model of the plurality of polarization components.

(15)

The image processing device according to (14), in which the correction pixel information includes position information of a pixel that fails to obtain a pixel signal corresponding to incident light.

INDUSTRIAL APPLICABILITY

In the image processing device and the image processing method of the present technology, the use of the pixel signal of the target pixel of the polarized image including pixels of each of a plurality of polarization components and the pixel signal of a pixel of the identical polarization component located near the target pixel allows the demosaicing for calculating a pixel signal for each polarization component different from the polarization component of the polarized image in the target pixel to be performed. Thus, the pixel signals of a plurality of polarization components can be obtained for each pixel, and so information with high resolution, for example, a pixel signal of normal information and non-polarized image can be easily obtained for each pixel. Thus, it is suitable for a device that performs control or the like using the normal information or non-polarized image, for example, a vehicle control system or the like.

REFERENCE SIGNS LIST 11, 12, 13, 14 image processing device
21, 22 polarization imaging unit
31 white balance adjustment unit
41, 42 demosaicing unit
43 demosaicing/signal correction unit
51 non-polarized image acquisition unit
52 color non-polarized image acquisition unit
61, 62, 63 normal information acquisition unit
210 image sensor
211 polarization filter
212 color mosaic filter
411, 421, 431 low frequency component calculation unit
412, 422, 432 component information acquisition unit
413, 423, 433 signal calculation unit
430 correction pixel information storage unit

The invention claimed is:

1. An image processing device comprising:
a demosaicing unit configured to use a pixel signal of a target pixel of a polarized image including pixels for each of a plurality of polarization components and a pixel signal of a pixel for each of identical polarization components located near the target pixel to calculate a pixel signal for each polarization component different from the polarization component of the polarized image in the target pixel,
wherein the demosaicing unit calculates the pixel signal for each polarization component in the target pixel on a basis of a low frequency component for each polarization component and component information indicating a relationship between the low frequency component of the polarization component of the polarized image and the pixel signal of the target pixel, the low frequency component for each polarization component being calculated by using the pixel signal of the pixel located near the target pixel for each of the identical polarization components, and
wherein the demosaicing unit is implemented via at least one processor.

2. The image processing device according to claim 1, further comprising:
a low frequency component calculation unit configured to calculate the low frequency component by performing two-dimensional filtering using the pixel signal of the pixel of the identical polarization component located near the target pixel,
wherein the low frequency component calculation unit is implemented via at least one processor.

3. The image processing device according to claim 1,
wherein the demosaicing unit generates, by using each pixel of the polarized image as the target pixel, a polarized image for each polarization component.

4. An image processing device comprising:
a demosaicinq unit configured to use a pixel signal of a target pixel of a polarized image including pixels for each of a plurality of polarization components and a pixel signal of a pixel for each of identical polarization components located near the target pixel to calculate a pixel signal for each polarization component different from the polarization component of the polarized image in the target pixel; and
a normal information acquisition unit configured to acquire normal information by using the pixel signal for each of the plurality of polarization components that is calculated by the demosaicing,
wherein the demosaicinq unit and the normal information acquisition unit are each implemented via at least one processor.

5. The image processing device according to claim 4,
wherein the normal information acquisition unit performs fitting to a polarization characteristic model by using the pixel signal for each of the plurality of polarization components to acquire the normal information from the fitted polarization characteristic model.

6. The image processing device according to claim 4, wherein the demosaicing unit generates, by using each pixel of the polarized image as the target pixel, a polarized image for each polarization component.

7. An image processing device comprising:
a demosaicing unit configured to use a pixel signal of a target pixel of a polarized image including pixels for each of a plurality of polarization components and a pixel signal of a pixel for each of identical polarization components located near the target pixel to calculate a pixel signal for each polarization component different from the polarization component of the polarized image in the target pixel; and
a normal information acquisition unit configured to acquire normal information by using the pixel signal of the target pixel calculated by the demosaicing unit,
wherein the polarized image including the pixels for each of the plurality of polarization components is a color polarized image,
wherein the demosaicing unit uses the pixel signal of the pixel for each of the identical polarization components located near the target pixel for each color component to calculate the pixel signal for each polarization component in the target pixel for each color component, and
wherein the demosaicing unit and the normal information acquisition unit are each implemented via at least one processor.

8. The image processing device according to claim 7, wherein the normal information acquisition unit calculates luminance for each polarization component by using the pixel signal for each color component that is calculated by the demosaicing unit for each polarization component to acquire the normal information on a basis of the calculated luminance for each polarization component.

9. The image processing device according to claim 7, further comprising:
a white balance adjustment unit configured to adjust white balance of the color polarized image,
wherein the demosaicing unit uses the color polarized image subjected to the white balance adjustment to calculate the pixel signal for each of the plurality of polarization components for each color component,
wherein the normal information acquisition unit calculates color difference for each polarization component by using the pixel signal for each color component that is calculated by the demosaicing unit for each polarization component to acquire the normal information on a basis of the calculated color difference for each polarization component, and
wherein the white balance adjustment unit is implemented via at least one processor.

10. The image processing device according to claim 7, wherein the demosaicing unit generates, by using each pixel of the polarized image as the target pixel, a polarized image for each polarization component.

11. An image processing device comprising:
a demosaicinq unit configured to use a pixel signal of a target pixel of a polarized image including pixels for each of a plurality of polarization components and a pixel signal of a pixel for each of identical polarization components located near the target pixel to calculate a pixel signal for each polarization component different from the polarization component of the polarized image in the target pixel; and
a non-polarized image acquisition unit configured to generate a pixel signal of a non-polarized image from the pixel signal for each of the plurality of polarization components,
wherein the demosaicinq unit and the non-polarized image acquisition unit are each implemented via at least one processor.

12. The image processing device according to claim 11, wherein the non-polarized image acquisition unit calculates the pixel signal of the non-polarized image by averaging the pixel signals for each of the plurality of polarization components.

13. The image processing device according to claim 11, wherein the polarized image including the pixels for each of the plurality of polarization components is a color polarized image,
wherein the demosaicing unit uses the pixel signal of the pixel for each of the identical polarization components located near the target pixel for each color component to calculate the pixel signal for each polarization component in the target pixel for each color component, and
wherein the non-polarized image acquisition unit calculates the pixel signal of the non-polarized image for each color component by using the pixel signal for each polarization component that is calculated by the demosaicing unit for each color component.

14. The image processing device according to claim 11, wherein the demosaicing unit generates, by using each pixel of the polarized image as the target pixel, a polarized image for each polarization component.

15. An image processing device comprising:
a demosaicing unit configured to use a pixel signal of a target pixel of a polarized image including pixels for each of a plurality of polarization components and a pixel signal of a pixel for each of identical polarization components located near the target pixel to calculate a pixel signal for each polarization component different from the polarization component of the polarized image in the target pixel; and
a correction pixel information storage unit configured to store correction pixel information,
wherein the demosaicing unit calculates a pixel signal of a correction pixel indicated by the correction pixel information by using a pixel signal of a peripheral pixel having a different polarization component on a basis of a polarization characteristic model of the plurality of polarization components, and
wherein the demosaicinq unit and the correction pixel information storage unit are each implemented via at least one processor.

16. The image processing device according to claim 15, wherein the correction pixel information includes position information of a pixel that fails to obtain a pixel signal corresponding to incident light.

17. The image processing device according to claim 15, wherein the demosaicing unit generates, by using each pixel of the polarized image as the target pixel, a polarized image for each polarization component.

18. An image processing method comprising:
using a pixel signal of a target pixel of a polarized image including pixels for each of a plurality of polarization components and a pixel signal of a pixel for each of identical polarization components located near the target pixel to calculate a pixel signal for each polarization component different from the polarization component of the polarized image in the target pixel, wherein the pixel signal for each polarization component in the target pixel is calculated on a basis of a low frequency component for each polarization component and component information indicating a relationship between the low frequency component of the polarization component of the polarized image and the pixel signal of the target pixel, the low frequency component for each polarization component being calculated by using the pixel signal of the pixel located near the target pixel for each of the identical polarization components.

19. An image processing method comprising:

using a pixel signal of a target pixel of a polarized image including pixels for each of a plurality of polarization components and a pixel signal of a pixel for each of identical polarization components located near the target pixel to calculate a pixel signal for each polarization component different from the polarization component of the polarized image in the target pixel; and acquiring normal information by using the calculated pixel signal for each of the plurality of polarization components.

20. An image processing method comprising:

using a pixel signal of a target pixel of a polarized image including pixels for each of a plurality of polarization components and a pixel signal of a pixel for each of identical polarization components located near the target pixel to calculate a pixel signal for each polarization component different from the polarization component of the polarized image in the target pixel; and acquiring normal information by using the calculated pixel signal of the target pixel, wherein the polarized image including the pixels for each of the plurality of polarization components is a color polarized image, and wherein the pixel signal of the pixel for each of the identical polarization components located near the target pixel is used for each color component to calculate the pixel signal for each polarization component in the target pixel for each color component.

21. An image processing method comprising:

using a pixel signal of a target pixel of a polarized image including pixels for each of a plurality of polarization components and a pixel signal of a pixel for each of identical polarization components located near the target pixel to calculate a pixel signal for each polarization component different from the polarization component of the polarized image in the target pixel; and generating a pixel signal of a non-polarized image from the pixel signal for each of the plurality of polarization components.

22. An image processing method comprising:

using a pixel signal of a target pixel of a polarized image including pixels for each of a plurality of polarization components and a pixel signal of a pixel for each of identical polarization components located near the target pixel to calculate a pixel signal for each polarization component different from the polarization component of the polarized image in the target pixel; and storing correction pixel information, wherein a pixel signal of a correction pixel indicated by the correction pixel information is calculated by using a pixel signal of a peripheral pixel having a different polarization component on a basis of a polarization characteristic model of the plurality of polarization components.

* * * * *